US012775065B2

(12) United States Patent
Cho et al.

(10) Patent No.: US 12,775,065 B2
(45) Date of Patent: Oct. 27, 2026

(54) ELECTRONIC DEVICE FOR PERFORMING DISTANCE MEASUREMENT THROUGH COMMUNICATION CIRCUIT AND OPERATION METHOD THEREOF

(71) Applicant: Samsung Electronics Co., Ltd., Gyeonggi-do (KR)

(72) Inventors: Namjun Cho, Gyeonggi-do (KR); Hyewon Jo, Gyeonggi-do (KR); Hyoseok Na, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 221 days.

(21) Appl. No.: 18/599,519

(22) Filed: Mar. 8, 2024

(65) Prior Publication Data

US 2024/0264270 A1 Aug. 8, 2024

Related U.S. Application Data

(63) Continuation of application No. PCT/KR2023/018381, filed on Nov. 15, 2023.

(30) Foreign Application Priority Data

Nov. 15, 2022 (KR) ........................ 10-2022-0152734
Dec. 26, 2022 (KR) ........................ 10-2022-0184325

(51) Int. Cl.
*G01S 7/35* (2006.01)
*G01S 13/32* (2006.01)

(52) U.S. Cl.
CPC .............. *G01S 7/352* (2013.01); *G01S 13/32* (2013.01)

(58) Field of Classification Search
CPC .......... G01S 7/352; G01S 13/32; G01S 7/006; G01S 7/292; G01S 7/2921; G01S 13/343; G01S 7/35; G01S 11/02
See application file for complete search history.

(56) References Cited

U.S. PATENT DOCUMENTS 10,018,716 B2 * 7/2018 Ferguson .............. G01S 13/882
10,317,512 B2 6/2019 Trotta et al.
(Continued)

FOREIGN PATENT DOCUMENTS

CN 110988862 A 4/2020
CN 114708663 A 7/2022
(Continued)

OTHER PUBLICATIONS

Onsemi.com, 3.3 V ECL Programmable Delay Chip, 2021 (cited in IDS) (Year: 2021).*

(Continued)

*Primary Examiner* — Resha Desai
*Assistant Examiner* — Juliana Cross
(74) *Attorney, Agent, or Firm* — Sughrue Mion, PLLC

(57) ABSTRACT

According to an embodiment, an electronic device comprises: a first antenna; a second antenna; a first signal generator configured to generate a first chirp signal; a second signal generator configured to generate a second chirp signal by adding an offset to the first chirp signal; and a processor operatively connected with the first signal generator and the second signal generator, wherein the processor is configured to: control the first signal generator to transmit the first chirp signal through the first antenna; control to receive a reception signal through a second antenna in association with the first chirp signal transmitted through the first antenna; control to mix the second chirp signal with the reception signal to generate a third signal; and control to filter the third signal.

20 Claims, 15 Drawing Sheets

(56) References Cited

U.S. PATENT DOCUMENTS

| | | | |
|---|---|---|---|
| 10,374,675 B1 | 8/2019 | Marr et al. | |
| 10,663,559 B2 | 5/2020 | Huemer et al. | |
| 10,725,150 B2 | 7/2020 | Trotta et al. | |
| 11,119,186 B2 | 9/2021 | Roh | |
| 11,215,692 B2 | 1/2022 | Itkin et al. | |
| 11,327,172 B2 | 5/2022 | You | |
| 2008/0316090 A1* | 12/2008 | Shirakawa | G01S 13/325 342/195 |
| 2015/0226848 A1 | 8/2015 | Park | |
| 2016/0025844 A1 | 1/2016 | Mckitterick et al. | |
| 2020/0300996 A1 | 9/2020 | Cetinoneri et al. | |
| 2021/0055385 A1 | 2/2021 | Rimini et al. | |
| 2021/0055386 A1 | 2/2021 | Rimini et al. | |
| 2021/0165088 A1* | 6/2021 | Suzuki | G01S 7/4017 |
| 2022/0196795 A1 | 6/2022 | Wu et al. | |
| 2023/0296751 A1 | 9/2023 | Forbes et al. | |

FOREIGN PATENT DOCUMENTS

| | | | |
|---|---|---|---|
| DE | 102017118324 | A1 | 2/2019 |
| EP | 2985625 | B1 | 5/2017 |
| GB | 2553542 | A | 3/2018 |
| JP | 2010-85368 | A | 4/2010 |
| JP | 2013-83609 | A | 5/2013 |
| JP | 2021-505892 | A | 2/2021 |
| KR | 10-2015-0094240 | A | 8/2015 |
| KR | 10-2016-0077004 | A | 7/2016 |
| KR | 10-2016-0077006 | A | 7/2016 |
| KR | 10-2020-0078574 | A | 7/2020 |
| KR | 10-2020-0124838 | A | 11/2020 |

OTHER PUBLICATIONS

European Partial Search report dated Sep. 23, 2025.

On Semi: '3.3 V ECL Progrommable Delay Chip-MC100EP195—ONSEMI', pp. 1-17, 09): URL: https://www.onsemi.com/download/data-sheet/pdf/mc100ep195-d.pdf.

Communication dated Jan. 23, 2026 issued by the European Patent Office in European Patent Application No. 23892015.1.

* cited by examiner (a)

(b)

(a)

(b)

ELECTRONIC DEVICE FOR PERFORMING DISTANCE MEASUREMENT THROUGH COMMUNICATION CIRCUIT AND OPERATION METHOD THEREOF

CROSS REFERENCE TO RELATED APPLICATION(S)

This application is a continuation of International Application No. PCT/KR2023/018381 filed on Nov. 15, 2023, which claims priority under 35 U.S.C. 119 to Korean Patent Applications No. 10-2022-0152734 filed Nov. 15, 2022 and 10-2022-0184325 filed Dec. 26, 2022 in the Korean Intellectual Property Office, this disclosures of which are herein incorporated by reference.

BACKGROUND

Field

Certain embodiments relate to an electronic device for performing distance measurement through a communication circuit, and an operation method thereof.

Description of Related Art

Signal in a high frequency band (e.g., 20 GHz or higher) has different human tissue penetration characteristics than a signal in a low frequency band (e.g., 6 GHz or lower). A signal in the low frequency band does not penetrate the human body, but tends to be reflected and absorbed by the surface of the skin. Accordingly, harmfulness to the human body may be determined by a power density (PD) ($W/m^2$) value per unit area on the human body surface, rather than a conventional power absorption per unit mass (specific absorption ratio (SAR) (W/kg)). For example, according to the standard established by the federal communications commission (FCC), a power sensor is placed at a point spaced a predetermined distance (for example, about 2 mm) apart from the surface of an electronic device. A power value is measured by scanning the entire surface of the electronic device in the unit of a predetermined area (e.g., 4 $cm^2$). A value (power density) obtained by dividing the measured power value by a measurement area can be regulated so as not to exceed a predetermined value (e.g., 10 W/m2).

SUMMARY

According to an embodiment, an electronic device comprises: a first antenna; a second antenna; a first signal generator configured to generate a first chirp signal; a second signal generator configured to generate a second chirp signal; and a processor operatively connected with the first signal generator and the second signal generator, wherein the processor is configured to: cause the first antenna to transmit the first chirp signal; adding a specific offset to the first chirp signal, thereby resulting in the second chirp signal; synthesize the second chirp signal with a first reception signal received by the second antenna, thereby resulting in a first synthesized signal; and filter the first synthesized signal.

According to an embodiment, an electronic device comprises: a plurality of antennas; a radio frequency front end (RFFE) connected to the plurality of antennas, the RFFE and configured to process a transmitted RF signal or a received RF signal, the RFFE includes: a first signal generator configured to generate a first chirp signal; and a second signal generator configured to generate a second chirp signal, a radio frequency integrated circuit (RFIC) connected to the RFFE to process a transmitted signal or a received signal which is transmitted or received; and a processor operatively connected with the RFIC and the RFFE, wherein the processor is configured to: transmit the first chirp signal with a first at least one of the plurality of antennas; add a specific offset to the first chirp signal, thereby resulting in the second chirp signal; synthesize the second chirp signal with a first reception signal received by a second at least one antenna, thereby resulting in a first synthesized signal; and filter the first synthesized signal.

The technical problems, features, and effects of the disclosure are not limited to the above-mentioned technical problems, features, and effects, and other technical problems, features, and effects not mentioned may be clearly understood, through the following descriptions, by those skilled in the art to which the disclosure belongs.

DETAILED DESCRIPTION

Figure 1:
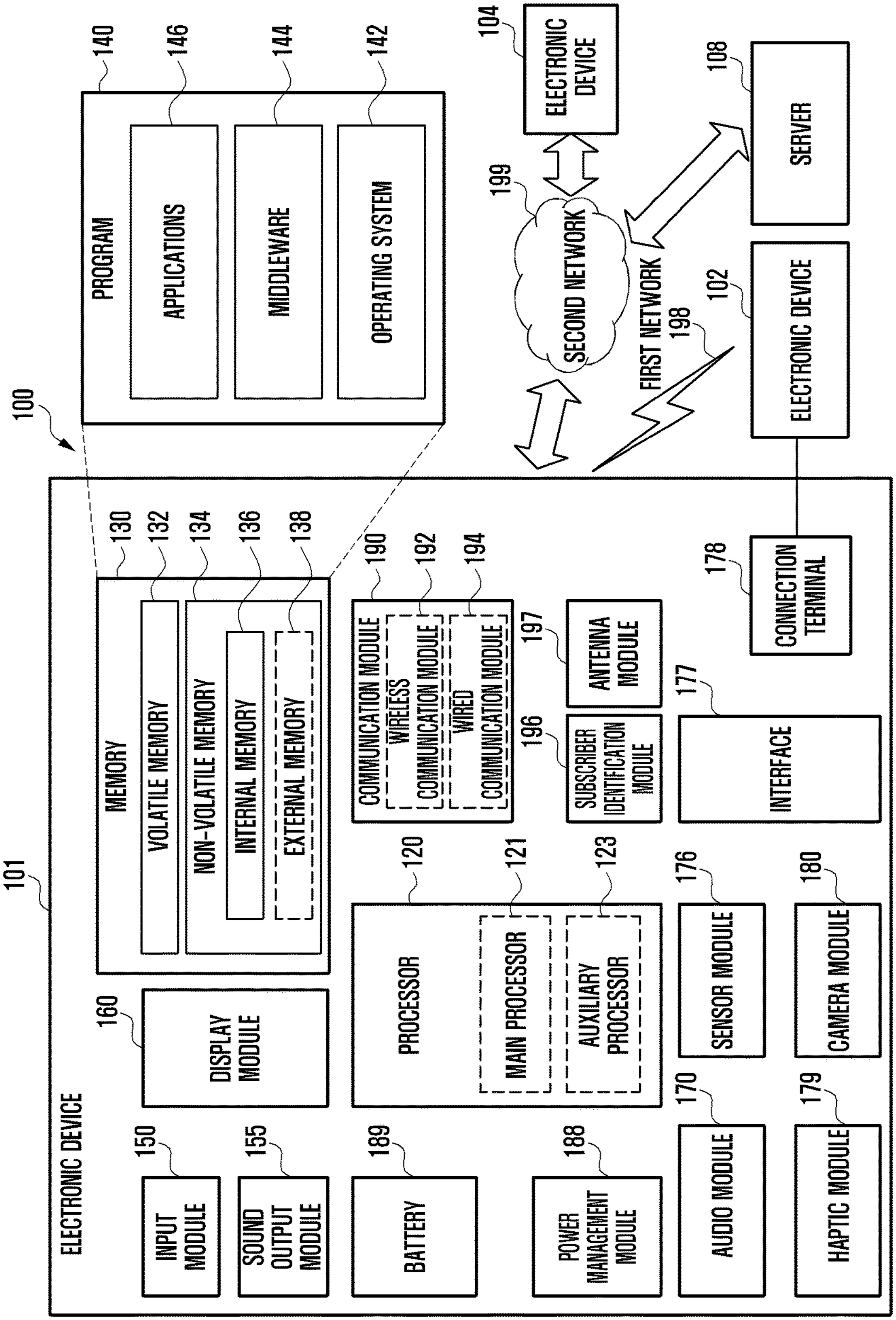
FIG. 1 is a block diagram of an electronic device according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
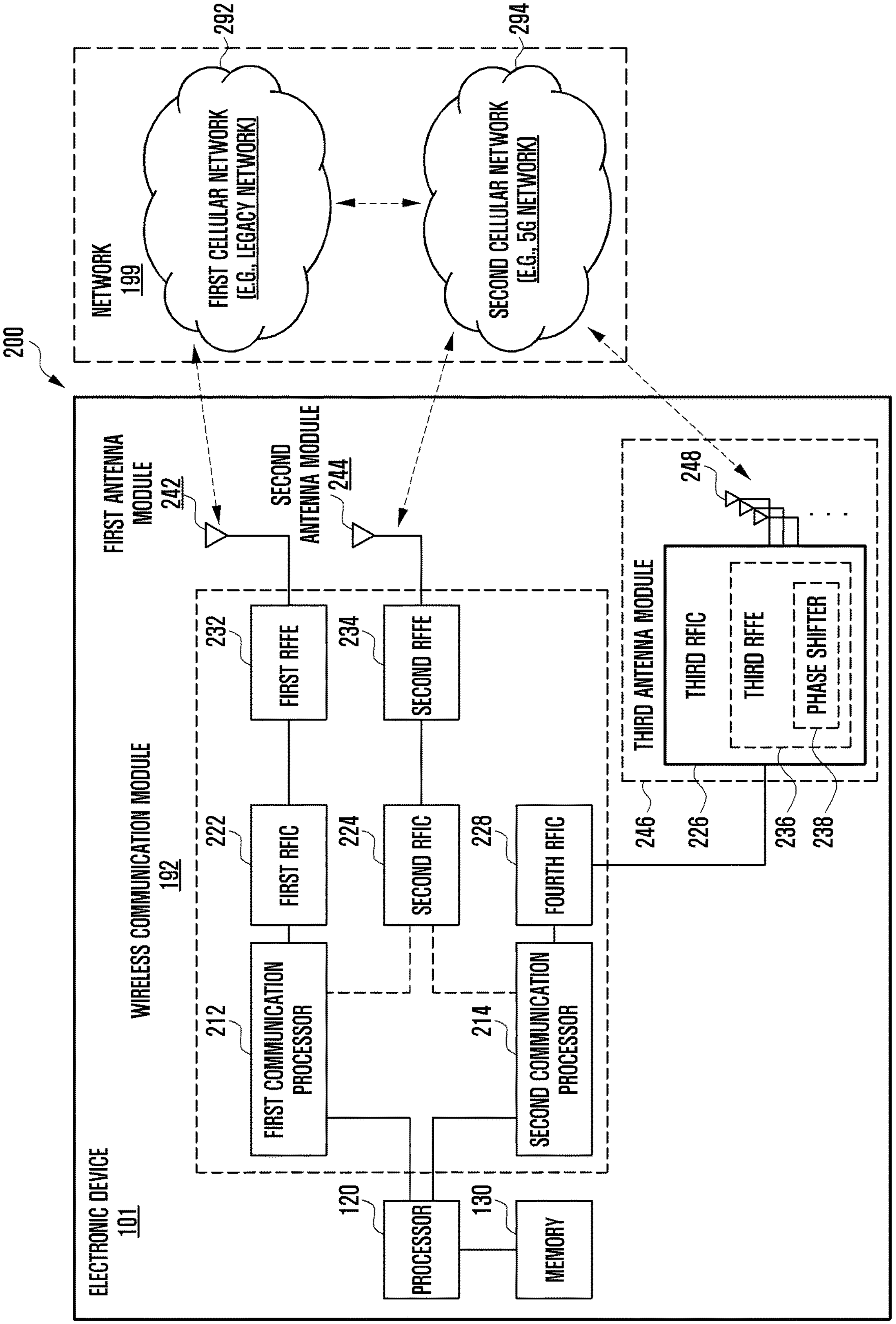
FIG. 2 is a block diagram of an electronic device for supporting legacy network communication and 5G network communication according to certain embodiments.

FIG. 2 is a block diagram 200 illustrating an example configuration of an electronic device 101 supporting legacy network communication and 5G network communication according to certain embodiments.

Referring to FIG. 2, according to certain embodiments, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel. According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel. According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
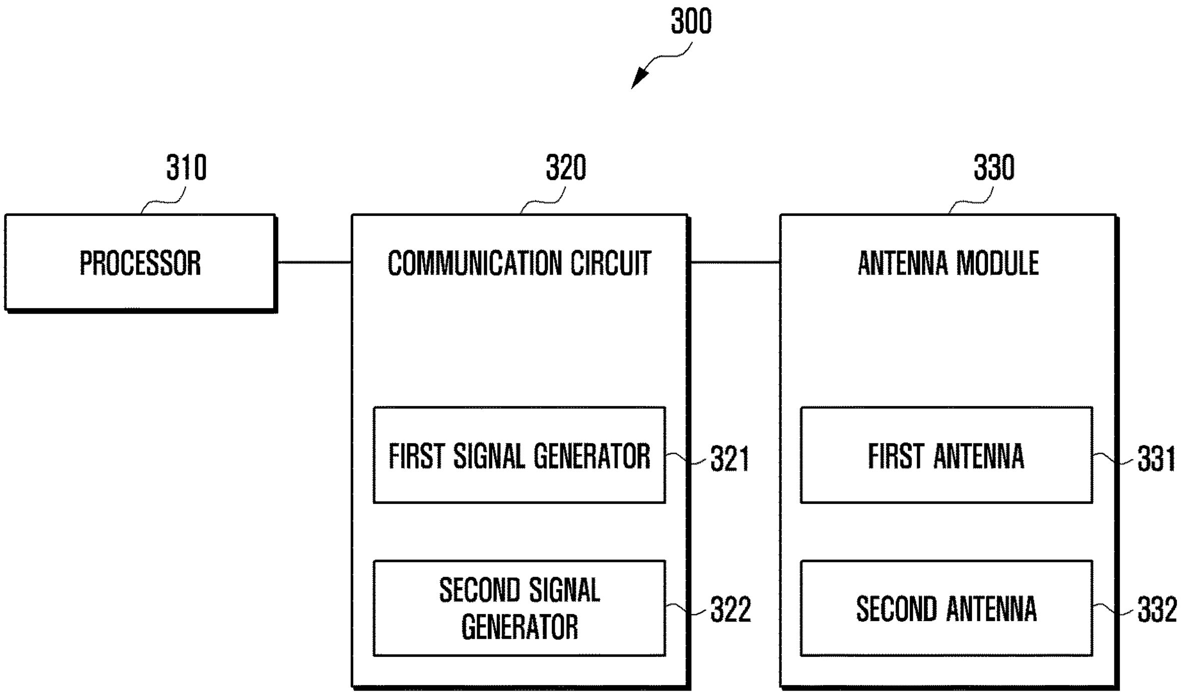
FIG. 3 is a block diagram of an electronic device according to certain embodiments.

FIG. 3 is a block diagram of an electronic device according to certain embodiments. The electronic device 300 may be implemented as a product such as a chipset.

An electronic device 300 (e.g., the electronic device 101 of FIG. 1) according to certain embodiments may include a processor 310 (e.g., the processor 120 or the communication processor 123 of FIG. 1), a communication circuit 320 (e.g., the communication module 190 of FIG. 1), and an antenna module 330 (e.g., the antenna module 197 of FIG. 1).

The antenna module 330 may be omitted from the electronic device 300. In this case, the antenna module 330 may be disposed external to the electronic device 300.

The communication circuit 320 may process a transmission signal to be transmitted through the antenna module 330. The communication circuit 320 may process a reception signal received through the antenna module 330.

The communication circuit 320 may transmit a specific signal through the antenna module 330, and accordingly process a received signal to measure a distance. For example, the distance may be measured based on a frequency modulated continuous wave (FMCW) radar function. The FMCW radar function may measure the distance to an object based on a transmission and reception times of an RF. That is, the FMCW can transmit an RF signal at a transmission time, and determine a reception time. The reception time is when the RF signal reflects from the object to the antenna module. The time difference between the reception time and the transmission time represents an amount of time for the signal to make a round trip to the object.

The communication circuit 320 may include a first signal generator 321 and a second signal generator 322.

The communication circuit 320 may generate a first chirp signal through the first signal generator 321. A chirp signal may be a modulated signal, where the frequency is linearly changed according to time.

The communication circuit 320 may transmit, through the antenna module 330, the first chirp signal.

The processor 310 may measure a distance to an object by using the transmitted first chirp signal and a resulting reception signal that is reflected by the object. For example, the reception signal may have a time delay. The time delay may be as long as a time when the signal propagates twice the distance R to the object (t=2R/c, wherein c is the speed of light).

By mixing the reception signal and the first chirp signal according to the time delay, an IF frequency that is proportional to a time difference may be identified. The IF frequency can be as shown in the following equation 1.

$$IF = \frac{2R}{c} \cdot \frac{BW}{T_c} \qquad \text{[Equation 1]}$$

Herein, BW may be the frequency range of the first chirp signal. The value Tc may be an amount of time for the chirp signal to have the lowest frequency to the highest frequency. Moreover, BW/Tc is the rate of frequency change in the first chirp signal.

The antenna module 330 may include a plurality of antennas. For example, the antenna module 330 may include the plurality of antennas (e.g., a first antenna 331 and a second antenna 332). The number of antennas of the antenna module 330 may include, for example, two or three or more antennas.

According to certain embodiments, the communication circuit 320 may be connected to at least one of the plurality of antennas (e.g., the first antenna 331 and the second antenna 332) to transmit or receive a signal.

According to certain embodiments, the communication circuit 320 may include a switch for electrical connection with at least one of the plurality of antennas (e.g., the first antenna 331 and the second antenna 332).

An example where the communication circuit 320 transmits a transmission signal through the first antenna 331 and receives a reception signal through the second antenna 332 will be described. It shall be understood, however, that the disclosure is not limited thereto, and there may be other embodiments, The first antenna 331 and the second antenna 332 may operate as a transmission and/or a reception antenna, respectively.

Each of the first antenna 331 and the second antenna 332 may include a plurality of antennas. For example, the first antenna 331 may include a plurality of antennas that may operate as transmission antennas in the antenna module 330. For example, the second antenna 332 may include a plurality of antennas that may operate as reception antennas in the antenna module 330. For example, when one or more antennas included in the antenna module 330 transmit a transmission signal, the one or more antennas may operate as the first antenna 331. When one or more antennas included in the antenna module 330 receive a reception signal and provide the signal to the communication circuit 320, the one or more antennas may be included in the second antenna 332. It is possible that one or more antennas of the first antenna may have common antennas with the one or more antennas of the second antenna.

The first antenna 331 and the second antenna 332 included in the antenna module 330 may be implemented as antennas corresponding to the same frequency band, but embodiments are not limited thereto.

After transmitting a first chirp signal, the processor 310 may generate a second chirp signal. The second chirp signal can be obtained by adding a specific offset to the first chirp signal. The second signal generator 322 of the communication circuit 320 may add the specific offset. For example, the second chirp signal may be the resulting signal from adding an offset according to a specified time delay to the first chirp signal. In another example, the second chirp signal may be the resultant signal from adding an offset according to a specified frequency difference to the first chirp signal.

The specific offset can be based on a value for correcting a coupling signal component (near-end coupling signal) received by the communication circuit 320 as the first chirp signal is transmitted.

When the processor 310 mixes the second chirp signal with a reception signal, the coupling signal component is corrected. Thus a frequency of a mixed signal may be lowered.

The processor 310 may filter a first mixed signal obtained by mixing the second chirp signal with a first reception signal using, for example, a high pass filter (HPF). The HPF can remove the coupling signal component.

The processor 310 may measure a distance to an object, based on the filtered reception signal and transmission signal (first chirp signal). The measured distance can then be used to selectively back off power (e.g., an effective radiated power (EIRP)) when the object is too close. That is, that the proximity of the object is within a specified distance. Selective back off power allows communication coverage to be expanded while meeting power regulations more efficiently.

Figure 4:
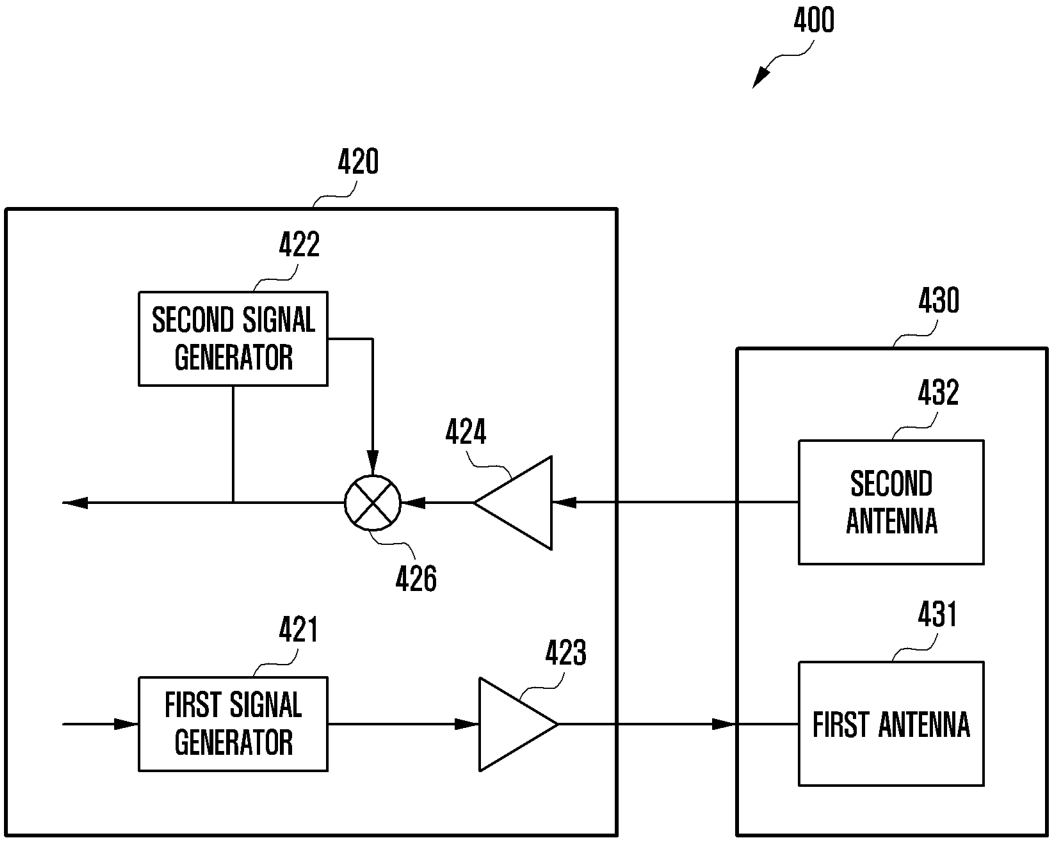
FIG. 4 is a block diagram of an electronic device according to an embodiment.

FIG. 4 is a block diagram of an electronic device according to an embodiment.

An electronic device 400 (e.g., the electronic device 300 of FIG. 3) according to certain embodiments may include a communication circuit 420 (e.g., the communication circuit 320 of FIG. 3) and an antenna module 430 (e.g., the antenna module 330 of FIG. 3). The electronic device 400 may be implemented as a product such as a chipset. Hereinafter, a detailed description of the content overlapping the content described with reference to FIG. 3 may be omitted.

The antenna module 430 may be omitted from the electronic device 400. In this case, the antenna module 430 may be disposed external to the electronic device 400.

The communication circuit 420 may amplify a first chirp signal with an amplifier 423, and transmit the amplified signal with a first antenna 431 (e.g., the first antenna 331 of FIG. 3).

According A signal received through a second antenna 432 (e.g., the second antenna 332 of FIG. 3) may be amplified by a low noise amplifier 424 and applied to a mixer 426.

Figure 5:
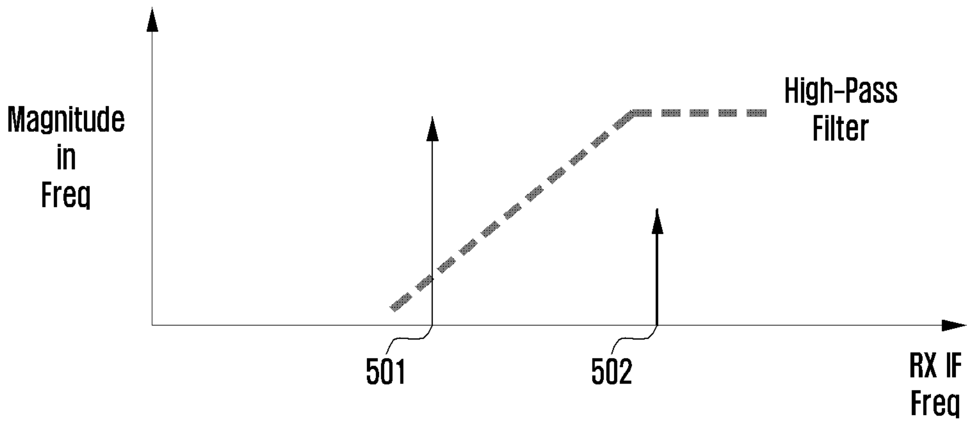
FIG. 5 is a diagram illustrating a reception signal component of an electronic device according to an embodiment.
Figure 5:
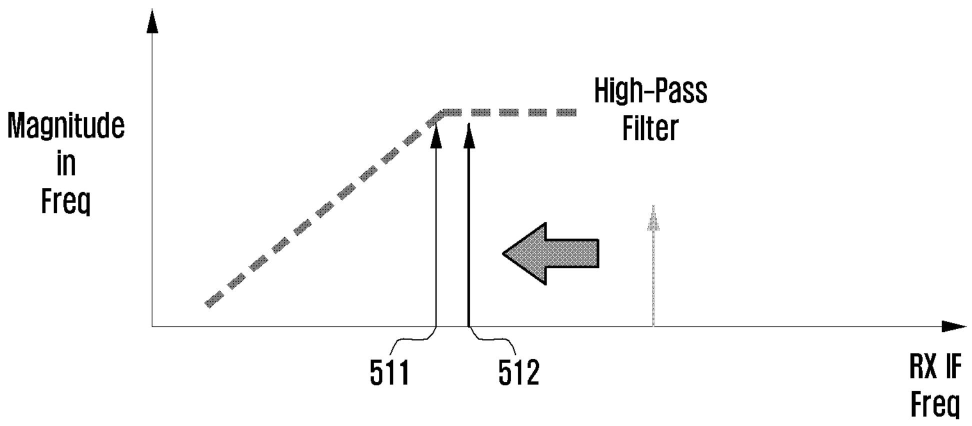

FIG. 5 is a diagram illustrating a reception signal component of the electronic device 400 according to an embodiment.

A reception signal applied to the communication circuit 420 may include a reflection signal component 502 or 512 representing an echo of the first chirp signal. That is, the reflection signal component represents the first chirp signal, after propagation into the air, reflection by an object, propagation back into the air, reception through the second antenna 432, amplification by the low noise amplifier 424.

A reception signal applied to the communication circuit 420 may include a coupling signal component 501 or 511. The coupling signal 501/511 is generated by the second antenna 432 by coupling (near-end coupling) with the first antenna 431, amplification through the low noise amplifier 424, and application to the mixer 426. The coupling signal component 501 or 511 may include an intermediate frequency (IF) signal having the highest intensity and the lowest frequency, among reception signals.

The communication circuit 420 may use a filter (e.g., a high pass filter) to remove the coupling signal component 501 or 511. In this case, an upper limit specified in a cut-off frequency may be configured so that an effect of removing a coupling signal is increased by increasing the cut-off frequency of the filter, but a reflection signal component is not filtered out.

Referring to case (a) of FIG. 5, when a location of a distance measurement target object is a predetermined distance or more, the coupling signal component 501 may be removed by filtering as described above, but the reflection signal component 502 may not be filtered out.

Referring to case (b) of FIG. 5, when a location of a target object is fairly close to the electronic device 400, IF components of the coupling signal (near-end coupled signal) component 511 and the reflection signal component 512 are adjacent to each other. Thus it may be difficult to remove the coupling signal component 511 using a filter.

The communication circuit 420 may generate a second chirp signal, where the second chirp signal is obtained by adding a specific offset to the first chirp signal. For example, the second chirp signal may be a signal obtained by adding an offset according to a specified time delay to the first chirp signal. In another example, the second chirp signal may be a signal obtained by adding an offset according to a specified frequency difference to the first chirp signal.

The specific offset added to the first chirp signal may correspond to a value for correcting a coupling signal (near-end coupling signal) component. The coupling signal component can be generated on the path that the first chirp signal is transmitted and is coupled to the second antenna 332.

When the processor 310 mixes the second chirp signal with a reception signal, the coupling signal component is corrected. Thus a frequency of a mixed signal may be lowered.

The processor 310 may filter a first mixed signal obtained by mixing the second chirp signal with a first reception signal with a high pass filter (HPF), removing the coupling signal component.

Figure 6:
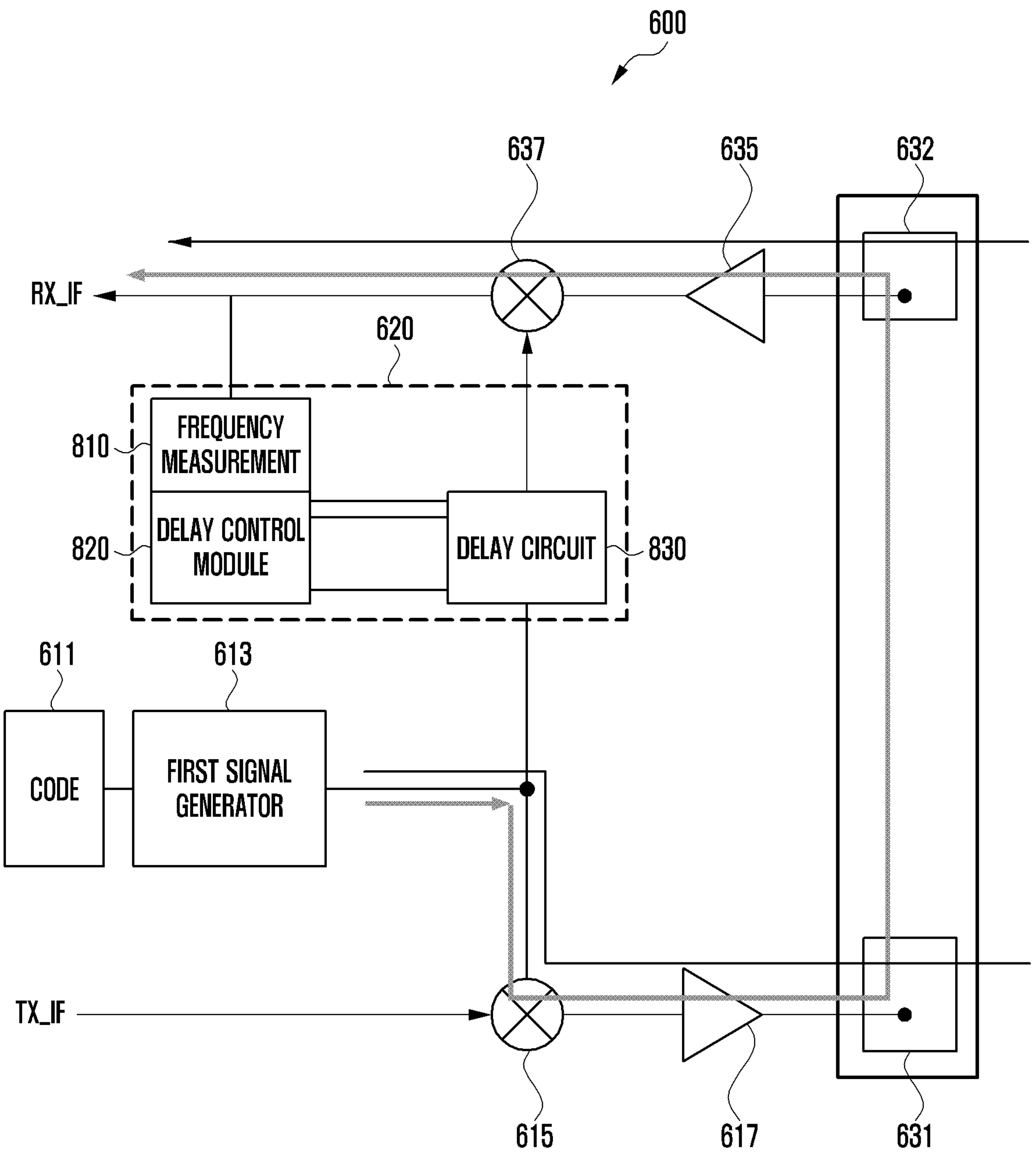
FIG. 6 is a block diagram of an electronic device according to an embodiment.

FIG. 6 is a block diagram of an electronic device 600 (e.g., the electronic device 300 of FIG. 3) according to an embodiment. The electronic device 600 may be implemented as a product such as a chipset.

A first chirp signal may be generated through a first signal generator 613 (e.g., the first signal generator 321 of FIG. 3) based on a transmission code output from a transmission code output unit 611.

The first chirp signal generated through the first signal generator 613 may be subjected to frequency band conversion through a mixer 615, and amplified through an amplifier 617 and transmitted through a first antenna 631 (e.g., the first antenna 331 of FIG. 3).

A signal received through a second antenna 632 (e.g., the second antenna 332 of FIG. 3) may be amplified through a low noise amplifier 635 and applied to a mixer 637.

In a case that the electronic device 600 does not include antenna module, the first antenna 631 and the second antenna 632 may be disposed external to the electronic device 600.

A second chirp signal obtained by adding a specific offset to the first chirp signal may be generated by a second signal generator 620 (e.g., the second signal generator 322 of FIG. 3). For example, the second chirp signal may be a signal obtained by adding an offset according to a specified time delay to the first chirp signal.

The specific offset added to the first chirp signal may correspond to a value for correcting a coupling signal (near-end coupling signal) component generated on a path in which the first chirp signal is output from the first signal generator 613 and transmitted through the first antenna 631 and is coupled to the second antenna 632 and received by the mixer 637.

The mixer 637 may mix the second chirp signal with a reception signal, and output the mixed signal. The coupling signal component is corrected and thus a frequency of the mixed signal may be lowered.

The second signal generator 620 may measure a frequency of the reception signal through a frequency measurer 810. An offset (e.g., a delay time) can be calculated from the measured frequency through a delay control module 820. A second chirp signal (e.g., a programmable delayed chirp signal) can be output by delaying the first chirp signal for the calculated delay time.

The electronic device 600 may measure an IF frequency value of a first reception signal including a coupling signal component (near-end coupled signal) in a state in which no object exists nearby, and calculate a delay time, based on the measured value.

Figure 7:
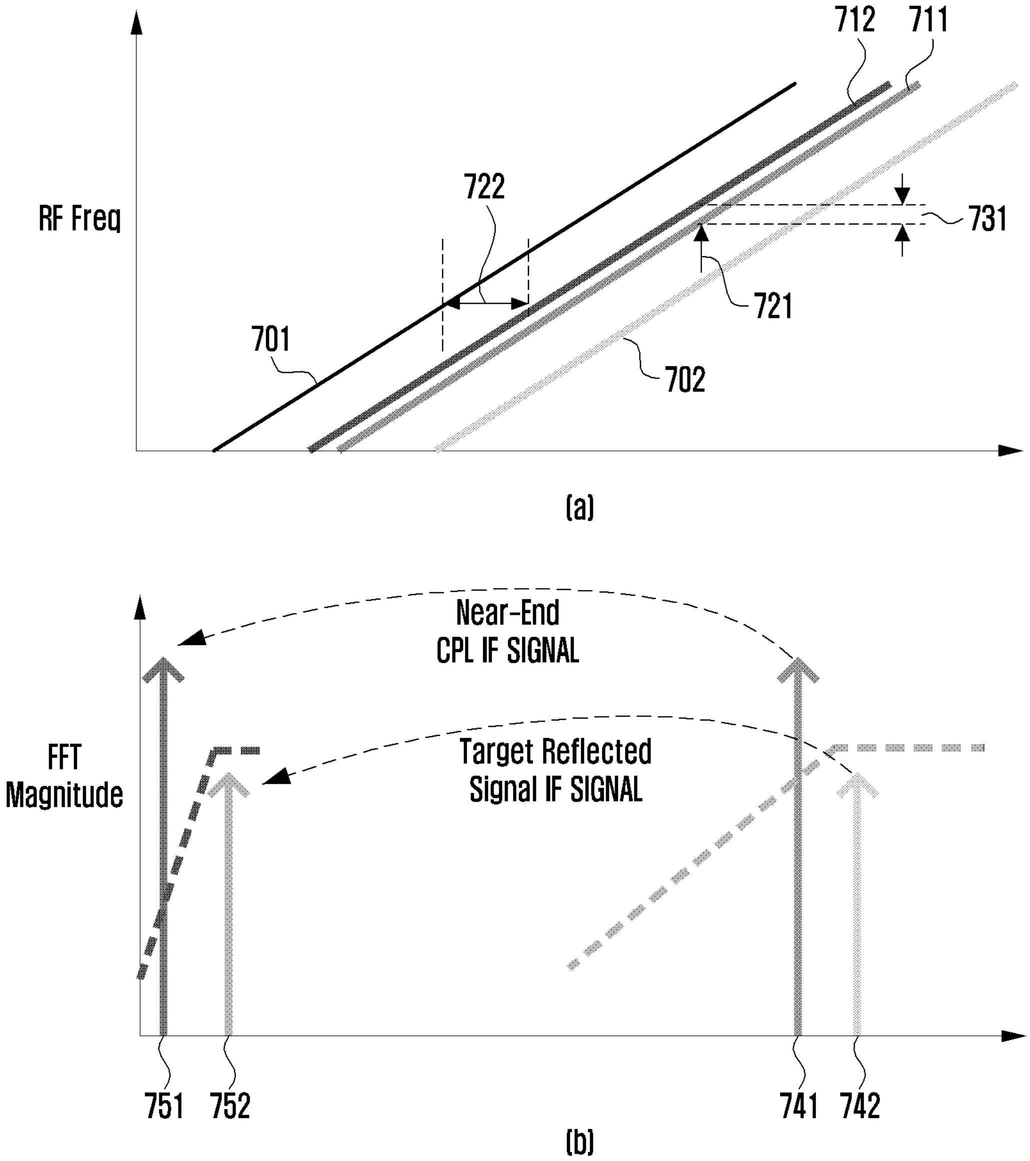
FIG. 7 is a diagram illustrating a reception signal component processed according to an operation of an electronic device according to an embodiment.

FIG. 7 is a diagram illustrating a reception signal component processed according to an operation of the electronic device 600 according to an embodiment.

Referring to case (a) of FIG. 7, with respect to a first chirp signal 701, a coupling signal component 711 may be applied to the mixer 637.

The second signal generator 620 may correct a delay time through a second chirp signal 712 generated by delaying a first chirp signal (original chirp signal) during a delay time 722 between the coupling signal component 711 and the first chirp signal by using a time delay circuit (e.g., a programmable time delay circuit).

It is noted that when the second chirp signal 712, is mixed with the coupling signal component 711, the second chirp signal is converted into an IF signal in a very low frequency band close to DC. An IF frequency output from the mixer 637 may be proportional to an error time between a time corrected by the time delay circuit of the second signal generator 620 and a delay time of a coupling signal. For example, when a movement distance until a transmitted signal is coupled and reaches the mixer 637 is about 10 cm, a band width of the first chirp signal 701 is about 5 GHz, a chirp interval is 1 us, a delay control unit of the time delay circuit is 100 ps, a maximum value of a delay error may be, for example, 50 ps, so that the IF frequency up to about 2 MHz of the coupling signal may be lowered by about 250 kHz by correction. Accordingly, the ratio of an IF frequency based on a signal reflected by an external object and received and an IF frequency of the coupling signal may be increased, so that the coupling signal can be removed more easily by an HPF.

In the above-described example, when a target object is located at a fairly close distance (e.g., assumed to be 1 cm), such as case (a) of FIG. 7, when equation 1 described above is applied, an IF frequency of a reflection signal component 702 may be generated as an IF frequency at 250+166=416 kHz which is a point away from the coupling signal component 711 by IF=2*R(1 cm)/c (3×10 ^8 m/s)*5 GHz/1 us=166 kHz 721.

Case (b) of FIG. 7 may illustrate signals 741 and 742 for which offset correction has not been performed and signals 751 and 752 for which offset correction as described above has been performed.

The signal 742 may correspond to a signal obtained at an IF output by the mixer 637 mixing the first chirp signal (original chirp signal) 701 and the reflection signal 702. The signal 741 may correspond to a signal obtained at an IF output by the mixer 637 mixing the first chirp signal (original chirp signal) 701 and the coupling signal 711.

The signal 752 may correspond to a signal obtained at an IF output by mixing the second chirp signal 712 to which an offset via a time delay is added and the reflection signal 702 by the mixer 637. The signal 751 may correspond to a signal obtained at an IF output by mixing the second chirp signal 712 to which an offset via a time delay is added and the coupling signal 711 by the mixer 637.

It is noted that when the second chirp signal 712, is mixed with the coupling signal component 711 or the reflection signal 702, the obtained IF frequency signal 751 or 752 is converted into an IF signal in a very low frequency band close to DC.

In removing interference (coupling signal component) by using an HPF, in the case of, for example, a tertiary filter, a difference of about 20 dB or more may occur between (1) a size capable of removing the frequency signal 741 around about 2 MHz when a passband of a filter is configured to be a signal of about 2.166 MHz and (2) a size capable of removing the frequency signal 752 around 250 kHz when the passband is configured to be a signal of about 416 kHz. Accordingly, even when a target object is at a fairly close distance, a coupling signal component can be effectively removed by mixing the reception signals 741 and 742 with the second chirp signal to which an offset via a time delay is added and lowering IF frequencies 751 and 752. Accordingly, the coupling signal component can be effectively removed even with an HPF filter having a low specification. The foregoing is advantageous in terms of design size and/or power consumption.

Figure 8:
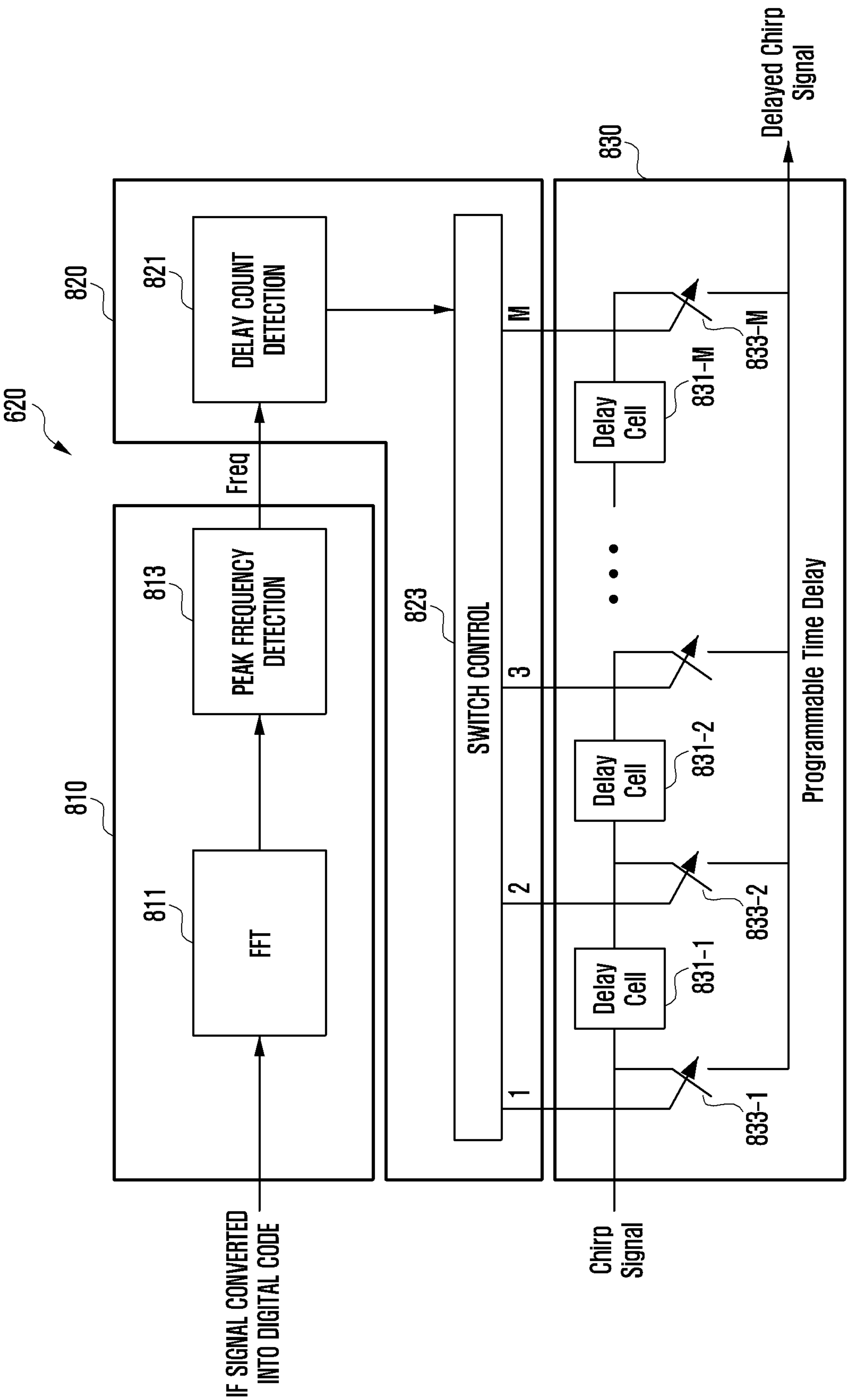
FIG. 8 is a block diagram illustrating in more detail components of an electronic device according to an embodiment.

FIG. 8 is a block diagram illustrating in more detail the second signal generator 620 of the electronic device 600 according to an embodiment. Hereinafter, an operation of the second signal generator 620 will be described in detail with reference to FIGS. 6 and 8.

The second signal generator 620 may include the frequency measurer 810, the delay control module 820, and the delay circuit 830.

When a coupling signal (near-end coupling) path from the first signal generator 613 to the mixer 637 via the first antenna 631 and the second antenna 632 is, for example, a distance of about 12 cm (2×6 cm), a time required for propagation may be about 400 ps. A time of 400 ps may be considerably longer than a chirp signal frequency period. For example, for 8 to 12 GHz, the period may be about 125 to 83 ps.

The second signal generator 620 may implement a delay cell (e.g., a signal delay circuit) by using a delay locked loop structure, and implement a target delay by cascading M delay cells.

The delay circuit 830 may include M cascaded delay cells 831-1, 831-2, . . . , and 831-M, and switches 833-1, 833-2, . . . , and 833-M connected to the delay cells 831-1, 831-2, . . . , and 831-M, respectively, to control an on-off operation.

When a first chirp signal is transmitted through the first antenna 631 where no external object exists, and then a fast Fourier transform (FFT) is performed on a coupling signal component received through the second antenna 632 and applied to the mixer 637, through an FFT module 811 of the frequency measurer 810, a peak may be formed at an IF frequency of a coupling signal component, and a peak frequency may be detected through a peak frequency measurer 813.

The delay control module 820 may identify a target delay time, based on a coupling signal path propagation time, and control the delay circuit 830.

The delay control module 820 may identify a path propagation time of a coupling signal through a delay count calculation unit 821, and identify the number of delay cells (Delay CNT N) for securing a target delay time.

Based on a frequency (Freq) at which a peak occurs (according to FFT) with respect to a coupling signal component, a coupling signal path propagation time may be calculated using the following equation 2.

$$T = Freq \cdot \frac{T_c}{BW} \qquad \text{[Equation 2]}$$

Herein, BW may be a bandwidth of the first chirp signal, and Tc may be a period of the first chirp signal.

When a propagation time T is divided by a delay time (1 Cell_Delay) performed by one delay cell, the number of delay cells (Delay CNT N) for securing a target delay time may be identified.

The switch control module 823 may adjust each of the switches in a time delay cell so that an input chirp signal passes through N delay cells among the total M delay cells of the delay circuit 830 and is output, based on an N value which is the identified number of delay cells, so as to generate a delayed chirp signal for a target delay time.

Figure 9:
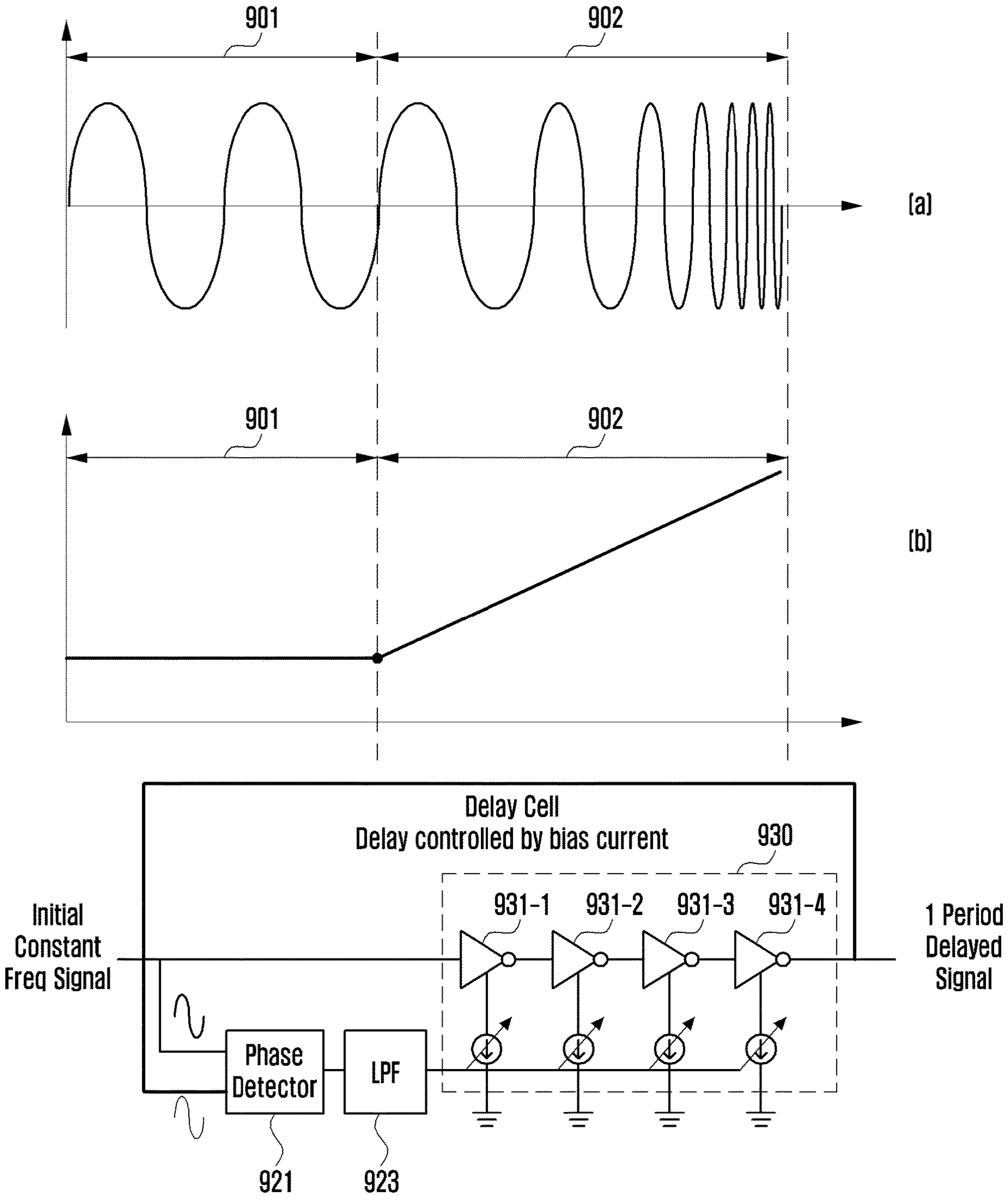
FIG. 9 is a diagram illustrating in more detail a reception signal processing operation of an electronic device according to an embodiment.

FIG. 9 is a diagram illustrating in more detail an operation of the second signal generator 620 of the electronic device 600 according to an embodiment.

For delay size correction of a delay cell in a delay circuit 930 (e.g., the delay circuit 830 of FIG. 8) having a delay locked loop structure, the second signal generator 620 operates the delay circuit 930 by using an initial frequency signal 901 (e.g., a single tone signal of a fixed frequency) before a frequency ramp-up 902 of a chirp signal starts.

A phase detector 921 may compare phases of an input signal and a signal having passed through a delay cell 930 to determine whether there is a phase difference.

When a phase difference is detected by the phase detector 921, a negative feedback loop may be operated. The negative feedback loop may be operated such that a low pass filter (LPF) 923 adjust a bias current of the delay cell 930. Adjusting the bias current may change the delay size so that the phase difference substantially becomes 0.

When the delay circuit 930 is in a steady state, the amount of delay generated by passing through delay cells may coincide with one period of an input signal. For example, when an initial start frequency of the chirp signal is about 8 GHz and the period thereof is 125 ps, the delay circuit 930 causes the amount of delay to be 125 ps. Accordingly, the delay circuit may more accurately generate a time delay (time delay) for the propagation path of a coupling signal component. The delay time being calculated by applying the amount of delay of 125 ps of the delay circuit 930 as a unit to the plurality of delay cells 831-1, . . . , and 831-M, through the control of the delay control module 820 of FIG. 8. For example, when the delay size of one delay cell is 125 ps, a maximum delay error remaining after compensation using a chirp signal generated by the second signal generator 620 may be about 62.5 ps. In this case, a maximum value of an IF frequency of a coupling signal component received according to transmission of a first chirp signal of the electronic device 600 of FIG. 6 may be 62.5 ps*5 GHz/1 us=312.5 kHz. Therefore, the IF frequency of the coupling signal component, which is generally 2 MHz, may be lowered up to 312.5 kHz.

Via a delay locked loop structure as shown in FIG. 9, a bias current of a delay cell may be set such that the amount of delay for each delay cell of the delay circuit 930 is constant. For example, 125 ps. By applying the same bias current to the delay cells 831-1, 831-2, . . . , 831-M of FIG. 8, a cascade of the plurality of delay cells having the same amount of delay may be realized. In the delay control operation of FIG. 8, for example, a second chirp signal may be generated by applying the amount of delay, 125 ps*M, to a first chirp signal.

In an example in which a bandwidth of a first chirp signal is about 5 GHz and a chirp interval is 1 us, and a movement distance is about 10 cm, a reflection signal component causes a minimum value of its frequency to be lowered to 312.5+166=478.5 kHz, so that a frequency component of a coupling signal component can be easily removed. Accordingly, the ratio of an IF frequency of a signal reflected by an external object an IF frequency of the coupling signal may be increased by, for example, about 6 times or more. Thus, the coupling signal can be removed by an HPF.

Figure 10:
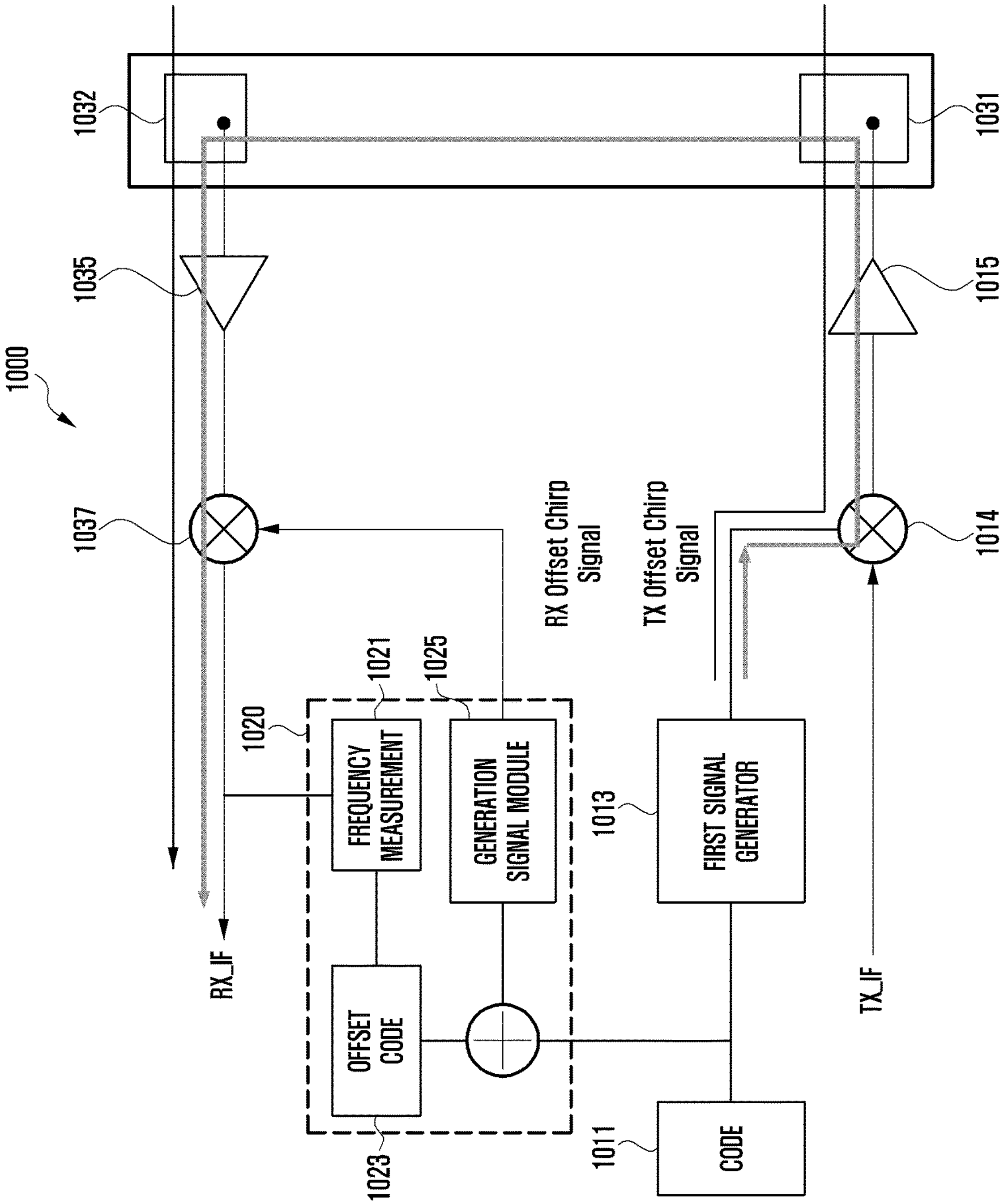
FIG. 10 is a block diagram of an electronic device according to an embodiment.

FIG. 10 is a block diagram of an electronic device 1000 (e.g., the electronic device 300 of FIG. 3) according to an embodiment. The electronic device 1000 may be implemented as a product such as a chipset.

A first chirp signal may be generated through a first signal generator 1013 (e.g., the first signal generator 321 of FIG. 3) based on a transmission code output from a transmission code output unit 1011.

The first chirp signal generated through the first signal generator 1013 may pass through a mixer 1014 to be amplified through an amplifier 1015 and transmitted through a first antenna 1031 (e.g., the first antenna 331 of FIG. 3).

A signal received through a second antenna 1032 (e.g., the second antenna 332 of FIG. 3) may be amplified through a low noise amplifier 1035 and applied to a mixer 1037. In cast that the electronic device 1000 does not include antenna module, the first antenna 1031 and the second antenna 1032 may be disposed external to the electronic device 1000.

A second chirp signal obtained by adding a specific offset to the first chirp signal may be generated by a second signal generator 1020 (e.g., the second signal generator 322 of FIG. 3). For example, the second chirp signal may be a signal obtained by adding a specified frequency offset to the first chirp signal.

The second chirp signal generated by the second signal generator 1020 may reflect an offset corresponding to a frequency difference occurring when the coupling signal component is mixed with the first chirp signal.

The specific offset added to the first chirp signal may correspond to a value for correcting a coupling signal (near-end coupling signal) component. The coupling signal component is generated on a path in which the first chirp signal is output from the first signal generator 1013 and transmitted through the first antenna 1031 and is coupled to the second antenna 1032 and received by the mixer 1037.

The mixer 1037 may mix the second chirp signal with a reception signal, and output the mixed signal. The coupling signal component is corrected and thus a frequency of the mixed signal may be lowered.

The second signal generator 1020 may measure a frequency of the reception signal, identify an offset (e.g., a frequency difference), based on the measured frequency, and output the second chirp signal. The second chirp signal can have a frequency difference from the first chirp signal by the offset, based on the identified offset.

The second signal generator 1020 may include a frequency measurer 1021, an offset code output unit 1023, and a signal generation module 1025.

The frequency measurer 1021 may compare a frequency of the reception signal applied to the mixer 1037 with a frequency of the first chirp signal, so as to identify an offset (e.g., a frequency difference).

The offset code output unit 1023 may output an offset code obtained by adding the offset identified by the frequency measurer 1021 to the transmission code output from the code output unit 1011. To this end, the offset code output unit 1023 may store an offset code previously measured and calculated in, for example, an environment where no reflection target object exists (e.g., inside a radiation performance test chamber for an mm-Wave antenna module, the chamber having EM absorbers installed on all surfaces inside thereof).

The signal generation module 1025 may generate the second chirp signal, which is a signal obtained by adding the identified frequency offset to the first chirp signal, based on the offset code.

Figure 11:
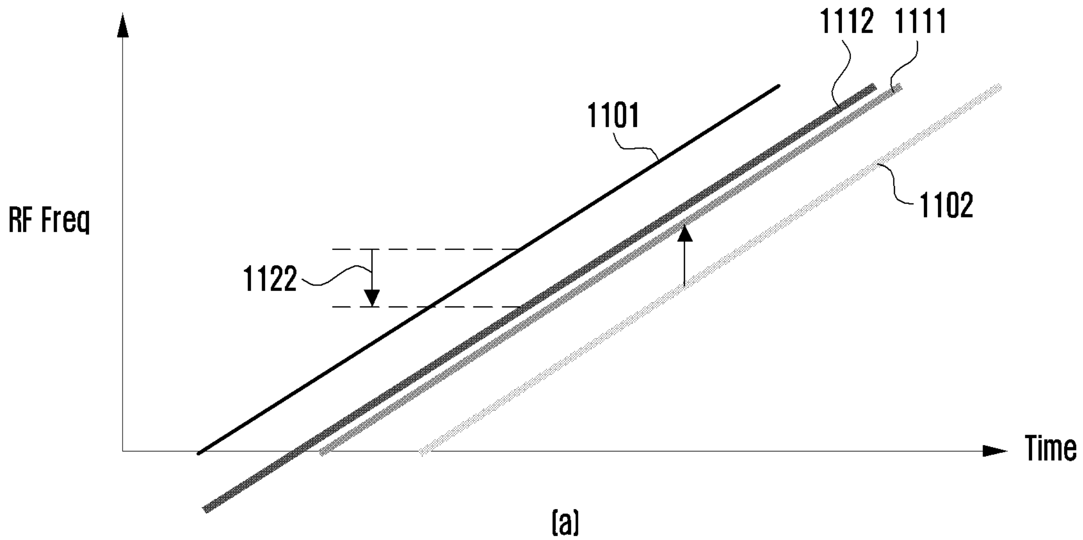
FIG. 11 is a diagram illustrating in more detail a reception signal processing operation of an electronic device according to an embodiment.
Figure 11:
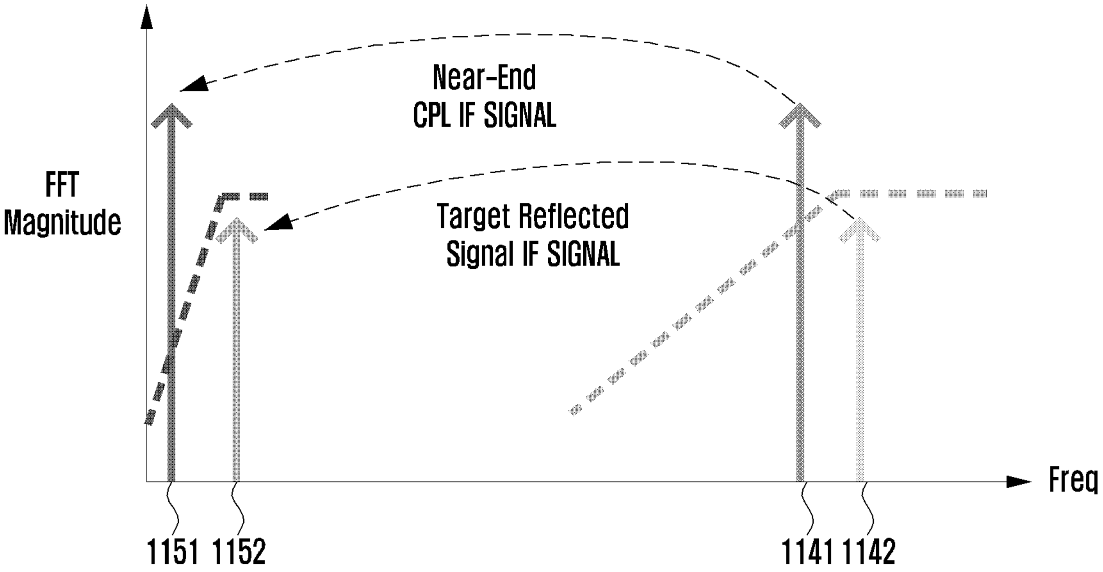

FIG. 11 is a diagram illustrating in more detail a reception signal processing operation of the electronic device 1000 according to an embodiment. Hereinafter, an operation of the electronic device 1000 will be described in detail with reference to FIGS. 10 and 11.

Referring to case (a) of FIG. 11, with respect to a first chirp signal 1101 output from the first signal generator 1013 and transmitted through the first antenna 1031, a coupling signal component 1111 generated via coupling between antennas (the first antenna 1031 and the second antenna 1032) and received through a signal path in a circuit of the electronic device 1000 may be applied to the mixer 1037.

Based on a frequency difference between a frequency of the identified coupling signal component 1111 and a frequency of the first chirp signal 1101, the second signal generator 1020 may correct the frequency difference via a second chirp signal 1112 generated by adding an offset 1122 corresponding to the frequency difference to a first chirp signal generation code.

It is noted that when the second chirp signal 1112, which is a delayed chirp signal, is mixed with the coupling signal component 1111, the second chirp signal is converted into an IF signal in a very low frequency band close to DC.

For example, in an example in which a movement distance until a transmitted signal is coupled and reaches the mixer 1037 is about 10 cm, a bandwidth of the first chirp signal 701 is about 5 GHz, and a chirp interval is 1 us, when a distance measurement target object is located at a fairly close distance (e.g., assumed to be 1 cm), referring to case (a) of FIG. 11, when equation 1 described above is applied, an IF frequency of a reflection signal component 1102 reflected by an object and received may be generated as an IF frequency at 250+166=416 kHz which is a point away from the coupling signal component 1111 by IF=2*R(1 cm)/c (3×10 ^8 m/s)*5 GHz/1 us=166 kHz 1121.

Case (b) of FIG. 11 may illustrate signals 1141 and 1142 for which offset correction has not been performed and signals 1151 and 1152 for which offset correction as described above has been performed.

The signal 1142 may correspond to a signal obtained at an IF output by mixing the first chirp signal (original chirp signal) 1101 and the reflection signal 1102 by the mixer 1037. The signal 1141 may correspond to a signal obtained at an IF output by mixing the first chirp signal (original chirp signal) 1101 and the coupling signal 1111 by the mixer 1037.

The signal 1152 may correspond to a signal obtained at an IF output by mixing the second chirp signal 1112 and the reflection signal 1102 by the mixer 1037. The signal 1151 may correspond to a signal obtained at an IF output by mixing the second chirp signal 1112 and the coupling signal 1111 by the mixer 1037.

It is noted that when the second chirp signal 1112, is mixed with the coupling signal component 1111 or the reflection signal 1102, the obtained IF frequency signal 1151 or 1152 is converted into an IF signal in a very low frequency band close to DC.

In removing interference (coupling signal component) by using an HPF, in the case of, for example, a tertiary filter, a difference of about 20 dB or more may occur between a size capable of removing the frequency signal 1142 around about 2 MHz when a passband of a filter is configured to be a signal of about 2.166 MHz and a size capable of removing the frequency signal 1152 around 250 kHz when the passband is configured to be a signal of about 416 kHz. Accordingly, even when a distance measurement target object is at a fairly close distance, when the second chirp signal to which an offset for frequency correction is added is mixed with the reception signals 1141 and 1142 and thus the IF frequencies thereof 1151 and 1152 are lowered, a coupling signal component can be effectively removed even with a relatively low-order HPF. Accordingly, the coupling signal component can be effectively removed even with an HPF filter design having a low specification, and thus an advantage can be obtained in terms of design size and/or power consumption.

Figure 12:
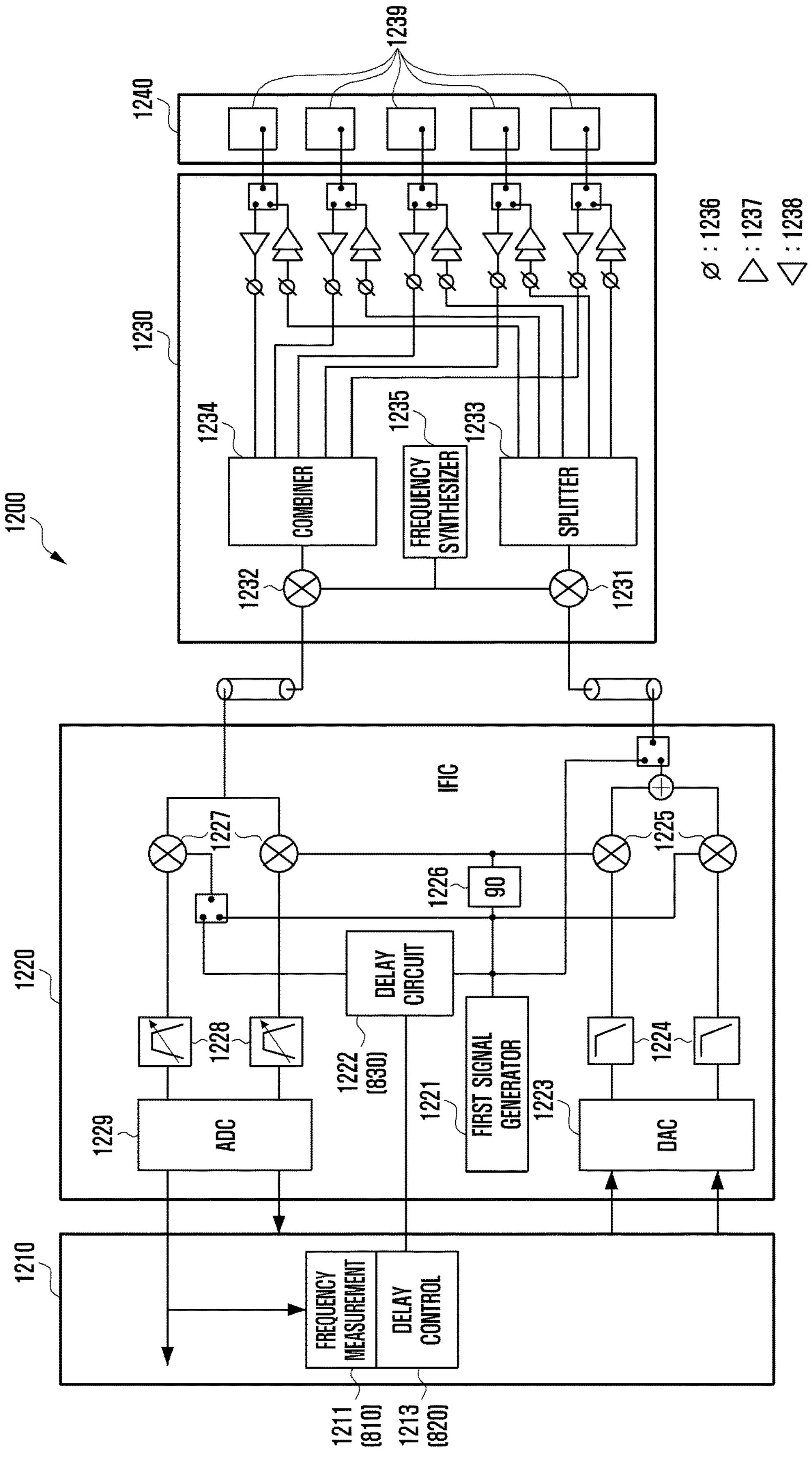
FIG. 12 is an example of a block diagram of an electronic device according to an embodiment.

FIG. 12 is an example of a block diagram of an electronic device 1200 (e.g., the electronic device 300 of FIG. 3) according to an embodiment. The electronic device 1200 may be implemented as a product such as a chipset.

The electronic device 1200 may include a processor 1210 (e.g., the processor 310 of FIG. 3), an RFIC 1220 (e.g., the first RFIC 222, the second RFIC 224, and the fourth RFIC 228 of FIG. 2 or the communication circuit 320 of FIG. 3), an RFFE 1230 (e.g., the first RFFE 232, the second RFFE 234, and the third RFFE 236 of FIG. 2 or the communication circuit 320 of FIG. 3), and an antenna module 1240 (e.g., the antenna module 330 of FIG. 3).

The antenna module 1230 may be omitted from the electronic device 1200. In this case, the antenna module 1230 may be disposed external to the electronic device 1200.

The RFIC 1220 may process a baseband signal received from the processor 1210 so that an RF signal is transmitted to the antenna module 1240 through the RFFE 1230.

The RFIC 1220 may convert an RF signal received through the antenna module 1240 and preprocessed through the RFFE 1230 into a baseband signal. The baseband signal can be processed by the processor 1210.

The RFIC 1220 may include various components for processing a transmitted or received signal. The RFIC 1220 may include, for example, various components (e.g., an amplifier, a switch, or a filter) which perform an operation of amplifying a signal and filtering the amplified signal. Classification of the processor 1210, the RFIC 1220, the RFFE 1230, and the antenna module 1240, and installation locations and/or functions of some of components included in each of them can be changed, integrated, or separated.

The RFIC 1220 may receive a transmission digital code, convert the transmission digital code into an analog signal (through a digital analog converter (DAC) 1223), filter the converted analog signal through a filter (e.g., a low pass filter) 1224, mix the filtered signal and an RF frequency signal output from an up converter 1226 through the mixer 1225, and transmit the mixed signal to the RFEE 1230.

The RFFE 1230 may include a mixer 1231 configured to mix a transmission signal received from the RFIC 1220 with a carrier frequency output from a frequency synthesizer 1235, and/or a splitter 1233 configured to separate a path of the transmission signal output from the mixer 1231.

The transmission signal separated through the splitter 1233 may be phase-changed through a plurality of phase converters 1236 located in a transmission path, amplified through a plurality of amplifiers 1237, and transmitted through a plurality of antennas 1239.

According to an embodiment, a reception signal received through the plurality of antennas 1239 may be amplified through a plurality of low noise amplifiers 1238, phase-changed through the plurality of phase converters 1236 located in a reception path, coupled through a combiner 1234, subjected to frequency band conversion through a mixer 1232, and applied to the RFIC 1220.

The transmission signal subjected to frequency band conversion through the mixer 1232 may be applied to a mixer 1227 of the RFIC 1220, filtered through a filter (e.g., a high pass filter) 1228, converted into a digital signal through an ADC 1229, and transmitted to the processor 1210.

The RFIC 1220 may perform measurement for distance measurement in a time interval during which a communication operation with a base station or an external device is not performed, in a situation where no external reflector exists, so as to transmit a first chirp signal generated through a first signal generator 1221 to the antenna module 1230, amplify the first chirp signal through the amplifiers 1237, and transmit the amplified signal through the plurality of antennas 1239.

The first chirp signal may be generated through the first signal generator 1221 (e.g., the transmission code output unit 611 and/or the first signal generator 613 of FIG. 6).

The electronic device 1200 may perform measurement for distance measurement in a time interval during which a communication operation with a base station or an external device is not performed, in a situation where no external reflector exists, so as to generate a first chirp signal through the first signal generator 1221, and cause the first chirp signal to be applied to the mixer 1231 in the RFFE 1230 via a switch connection.

The first signal generator 1221 may operate as a frequency synthesizer configured to generate a local oscillator (LO) signal applied to the mixer 1231 when performing a communication operation with a base station or an external device. The electronic device 1200 may generate an LO signal through the first signal generator 1221 to cause the LO signal to be applied to the mixer 1231 via a switch connection in a time interval during which a communication operation with a base station or an external device is performed, and process a transmission signal to cause the transmission signal to be transmitted through the antenna module 1240.

The first chirp signal generated through the first signal generator 1221 may be subjected to frequency band conversion through the mixer 1231 in a time interval during which a communication operation with a base station or an external device is not performed, in a situation where no external reflector exists, and amplified through the amplifiers 1237 and transmitted through at least one (e.g., the first antenna 631 of FIG. 6) of the plurality of antennas 1239.

According to an embodiments, a signal received through at least one (e.g., the second antenna 632 of FIG. 6) of the plurality of antennas 1239 may be amplified through a low noise amplifier 1238 of the RFFE 1230, subjected to frequency band conversion through the mixer 1232, and transmitted to the communication circuit 1220.

The reception signal subjected to frequency band conversion may pass through the mixer 1227 of the RFIC 1220 to be filtered through the filter (e.g., a high pass filter) 1228, converted into a digital signal through the ADC 1229, and transmitted to the processor 1210.

The electronic device 1200 may perform an operation for distance measurement in a time interval during which a communication operation with a base station or an external device is not performed, in a situation where no external reflector exists, so as to convert a reception signal received after outputting a first chirp signal into a digital signal, measure a frequency of the converted reception signal, and generate a second chirp signal, based on the measured frequency.

The processor 1210 may measure the frequency of the reception signal through a frequency measurer 1211 (e.g., the frequency measurer 810 of FIG. 6 or 8) with respect to the reception signal converted into the digital signal, calculate an offset (e.g., a delay time), based on the measured frequency value in a situation where no external reflector exists, through a delay control module 1213 (e.g., the delay control module 820 of FIG. 6 or 8), and output the second chirp signal (e.g., a programmable delayed chirp signal) by delaying the first chirp signal for the calculated delay time, through a delay circuit 1222 (e.g., the delay circuit 830 of FIG. 6 or FIG. 8), based on the calculated offset.

The processor 1210 may measure an IF frequency value of a first reception signal including a coupling signal component (near-end coupled signal) in a state in which no object exists nearby, and calculate a delay time, based on the measured value.

The second chirp signal output through the delay circuit 1222 may be mixed with the reception signal through the mixer 1227 to lower a frequency band of the coupling signal component included in the reception signal, so that the coupling signal component can be removed through the filter 1228.

Figure 13:
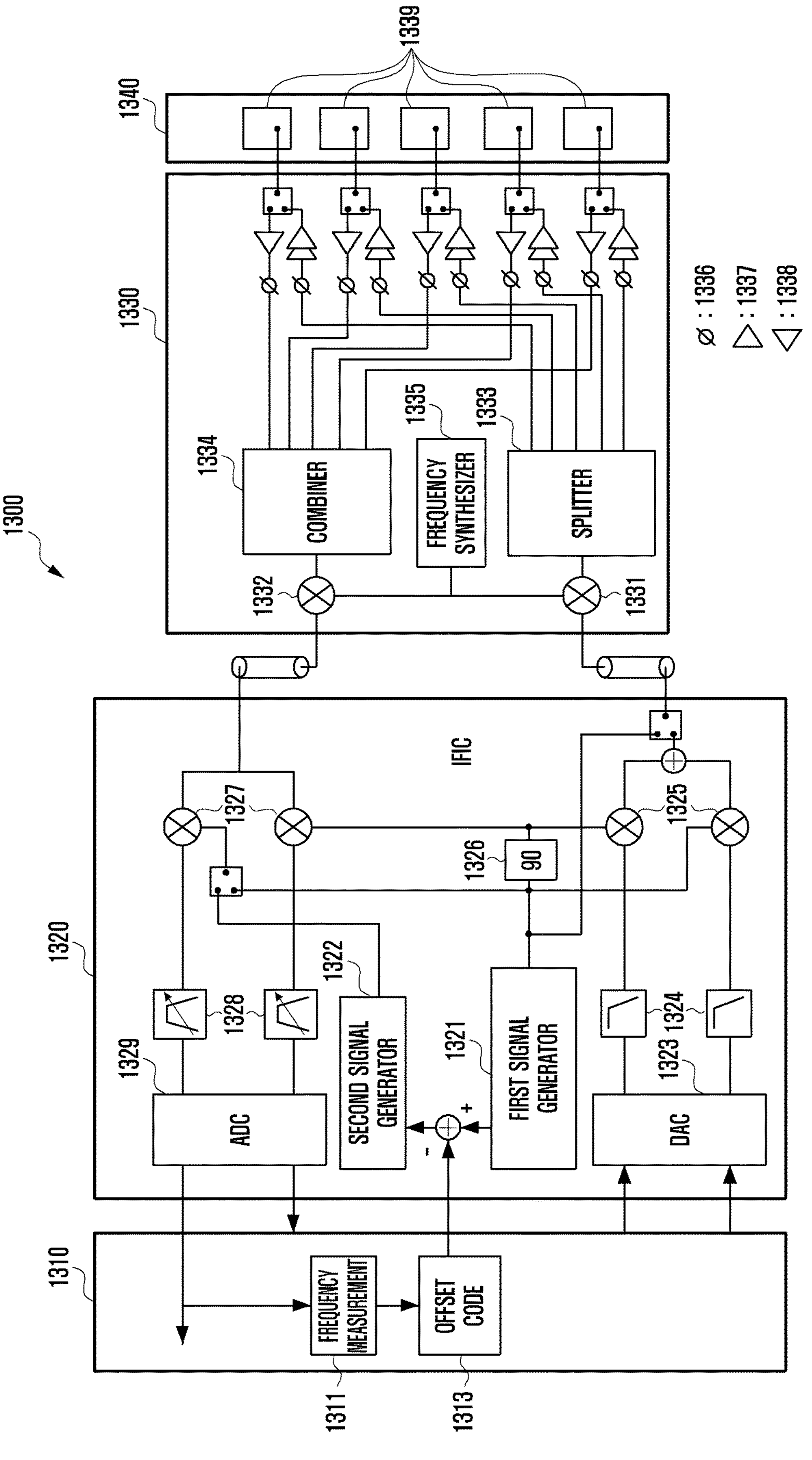
FIG. 13 is an example of a block diagram of an electronic device according to an embodiment.

FIG. 13 is an example of a block diagram of an electronic device according to an embodiment.

According to certain embodiments, an electronic device 1300 may include a processor 1310 (e.g., the processor 310 of FIG. 3), an RFIC 1320 (e.g., the first RFIC 222, the second RFIC 224, and the fourth RFIC 228 of FIG. 2 or the communication circuit 320 of FIG. 3), an RFFE 1330 (e.g., the first RFFE 232, the second RFFE 234, and the third RFFE 236 of FIG. 2), and an antenna module 1340 (e.g., the antenna module 330 of FIG. 3). The electronic device 300 may be implemented as a product such as a chipset.

The antenna module 1340 may be omitted from the electronic device 1300. In this case, the antenna module 1340 may be disposed external to the electronic device 1300.

The RFIC 1320 may process a baseband signal received from the processor 1310 so that an RF signal is transmitted to the antenna module 1340 through the RFFE 1330.

The RFIC 1320 may convert an RF signal received through the antenna module 1340 and preprocessed through the RFFE 1330 into a baseband signal to be able to be processed by the processor 1310.

The RFIC 1320 may include various components for processing a signal which is transmitted and/or received. The RFIC 1320 may include, for example, various components (e.g., an amplifier, a switch, or a filter) which perform an operation of amplifying a signal and filtering the amplified signal. Classification of the processor 1310, the RFIC 1320, the RFFE 1330, and the antenna module 1340, and installation locations and/or functions of some of components included in each of them may be changed, integrated, or separated.

The RFIC 1320 may receive a transmission digital code, convert the transmission digital code into an analog signal through a digital analog converter (DAC) 1323, filter the converted analog signal through a filter (e.g., a low pass filter) 1324, mix the filtered signal and an RF frequency signal output from an up converter 1326 through the mixer 1325, and transmit the mixed signal to the RFEE 1330.

The RFFE 1330 may include a mixer 1331 configured to mix a transmission signal received from the RFIC 1320 with a carrier frequency output from a frequency synthesizer 1335, and/or a splitter 1333 configured to separate a path of the transmission signal output from the mixer 1331.

The transmission signal separated through the splitter 1333 may be phase-changed through a plurality of phase converters 1336 located in a transmission path, amplified through a plurality of amplifiers 1337, and transmitted through a plurality of antennas 1339.

A reception signal received through the plurality of antennas 1339 may be amplified through a plurality of low noise amplifiers 1338, phase-changed through the plurality of phase converters 1336 located in a reception path, coupled through a combiner 1334, subjected to frequency band conversion through a mixer 1332, and applied to the RFIC 1320.

The transmission signal subjected to frequency band conversion through the mixer 1332 may be applied to a mixer 1327 of the RFIC 1320, filtered through a filter (e.g., a high pass filter) 1328, converted into a digital signal through an ADC 1329, and transmitted to the processor 1310.

The electronic device 1300 may generate a first chirp signal through a first signal generator 1321 in a time interval during which a communication operation with a base station or an external device is not performed, in a situation where no external reflector exists, and cause the first chirp signal to be applied to the mixer 1331 in the RFFE 1330 via a switch connection.

The first signal generator 1321 may operate as a frequency synthesizer configured to generate a local oscillator (LO) signal applied to the mixer 1331 when performing a communication operation with a base station or an external device. The electronic device 1300 may generate an LO signal through the first signal generator 1321 to cause the LO signal to be applied to the mixer 1331 via a switch connection in a time interval during which a communication operation with a base station or an external device is performed, and process a transmission signal to cause the transmission signal to be transmitted through the antenna module 1240.

The RFIC 1320 may transmit a first chirp signal generated through the first signal generator 1321 to the RFFE 1330 in a time interval during which a communication operation with a base station or an external device is not performed, in a situation where no external reflector exists, so as to amplify the first chirp signal through the amplifiers 1337, and transmit the amplified signal through the plurality of antennas 1339.

The first chirp signal may be generated through the first signal generator 1321 (e.g., the transmission code output unit 1011 and/or the first signal generator 1013 of FIG. 10).

The first chirp signal generated through the first signal generator 1321 may be subjected to frequency band conversion through the mixer 1331, amplified through the amplifiers 1337, and transmitted through at least one of the plurality of antennas 1339 (e.g., the first antenna 1031 of FIG. 10).

According to an embodiment, a signal received through at least one of the plurality of antennas 1339 may be amplified through a low noise amplifier 1338, subjected to frequency band conversion through the mixer 1332, and transmitted to the RFIC 1320.

The reception signal subjected to frequency band conversion may pass through the mixer 1327 of the RFIC 1320 to be filtered through the filter (e.g., a high pass filter) 1328, converted into a digital signal through the ADC 1329, and transmitted to the processor 1310.

The electronic device 1300 may convert a reception signal received after outputting a first chirp signal into a digital signal in a time interval during which a communication operation with a base station or an external device is not performed, in a situation where no external reflector exists, measure a frequency of the converted reception signal, and generate a second chirp signal, based on the measured frequency.

The processor 1310 may measure the frequency of the reception signal through a frequency measurer 1311 (e.g., the frequency measurer 1021 of FIG. 10) with respect to the reception signal converted into the digital signal, identify a frequency offset (e.g., corresponding to a frequency difference), based on the measured frequency, and output the second chirp signal to which the frequency offset is added through a second signal generator 1322 (e.g., the signal generation circuit 1025 of FIG. 10), based on an offset code output from an offset code output unit 1313 (e.g., the offset code output unit 1023 of FIG. 10)

The second chirp signal output through the second signal generation circuit 1322 is mixed with the reception signal through the mixer 1327 to lower a frequency band of the coupling signal component included in the reception signal, so that the coupling signal component can be removed through the filter 1328.

An electronic device (e.g., the electronic device 300, 400, 600, or 1000 of FIG. 3, 4, 6, or 10) may include a first antenna (e.g., the first antenna 331, 431, 631, or 1031 of FIG. 3, 4, 6, or 10), a second antenna (e.g., the second antenna 332, 432, 632, or 1032 of FIG. 3, 4, 6, or 10), a first signal generator (e.g., the first signal generator 321, 421, 613, or 1013 of FIG. 3, 4, 6, or 10) configured to generate a first chirp signal, a second signal generator (e.g., the second signal generator 322, 422, 620, or 1020 of FIG. 3, 4, 6, or 10) configured to generate a second chirp signal by adding an offset to the first chirp signal, and a processor (e.g., the processor 310, 1210, or 1310 of FIG. 3, 12, or 13) operatively connected with the first signal generator and the second signal generator. The processor may be configured to control the first signal generator to transmit the first chirp signal through the first antenna, control to receive a reception signal through a second antenna in association with the first chirp signal transmitted through the first antenna, control to mix the second chirp signal with the reception signal to generate a third signal, and control to filter the third signal.

According to certain embodiments, the processor is configured to control the second signal generator to add the offset to the first chirp signal for correcting, from the reception signal, a coupling signal component coupled to the second antenna on the path of the first chip signal transmitted through the first antenna.

According to certain embodiments, the processor is configured to control to mix the second chirp signal with the reception signal to lower the frequency of the third signal for the coupling signal component to be removed from the reception signal by mixing the second chirp signal with the reception signal and for passing a reflection signal component of the reception signal upon filtering of the third signal, wherein the reflection signal component represents the first chirp signal transmitted through the first antenna and reflected by an external object.

According to certain embodiments, the processor is configured to control to add the offset to the first chirp signal to generate the second chirp signal based on a time delay or a frequency difference to the first chirp signal.

According to certain embodiments, the second signal generator comprises a delay circuit (e.g., the delay circuit 830 of FIG. 8) configured to delay the first chirp signal based on a propagation time of the reception signal to generate the second chirp signal.

According to certain embodiments, the delay circuit comprises a plurality of delay cells, and wherein the processor is configured to control the delay circuit to pass the first chirp signal through a specified number of delay cells among the plurality of delay cells based on the propagation time.

According to certain embodiments, the processor is configured to control the second signal generator to generate the second chirp signal based on a frequency difference between the reception signal and the first chirp signal.

According to certain embodiments, the processor is configured to generate a digital code corresponding to the second chirp signal based on a digital code corresponding to the first chirp signal.

According to certain embodiments, the processor is configured to generate the digital code corresponding to the second chirp signal by adding an offset obtained from the frequency of the reception signal to the first digital code corresponding to the first chirp signal.

According to certain embodiments, the processor is configured to transmit the first chirp signal while the electronic device is located in a specified environment, measure a frequency of the reception signal received through the second antenna, calculate the offset based on the measured frequency of the reception signal and store the calculated offset for generating the second chirp signal.

An chipset (e.g., the electronic device 300, 400, 600, or 1000 of FIG. 3, 4, 6, or 10) may include a signal generator (e.g., the first signal generator 321, 421, 613, or 1013 of FIG. 3, 4, 6, or 10 and/or the second signal generator 322, 422, 620, or 1020 of FIG. 3, 4, 6, or 10) and a circuitry (e.g., the processor 310, 1210, or 1310 of FIG. 3, 12, or 13). The circuitry is configured to control the signal generator to transmit a first chirp signal through a first antenna and to generate a second chirp signal by applying an offset to the first chirp signal, receive a reception signal through a second antenna in association with the first chirp signal transmitted through the first antenna, mix the second chirp signal with the reception signal to generate a third signal, and filter the third signal.

According to certain embodiments, the circuitry is configured to control the signal generator to add the offset to the first chirp signal for correcting, from the reception signal, a coupling signal component coupled to the second antenna on the path of the first chip signal transmitted through the first antenna.

According to certain embodiments, the circuitry is configured to control to mix the second chirp signal with the reception signal to lower the frequency of the third signal for the coupling signal component to be removed from the reception signal by mixing the second chirp signal with the reception signal and for passing a reflection signal component of the reception signal upon filtering of the third signal, wherein the reflection signal component represents the first chirp signal transmitted through the first antenna and reflected by an external object.

According to certain embodiments, the circuitry is configured to control the signal generator to add the offset to the first chirp signal to generate the second chirp signal based on a time delay or a frequency difference to the first chirp signal.

According to certain embodiments, the second signal generator comprises a delay circuit (e.g., the delay circuit 830 of FIG. 8) configured to delay the first chirp signal based on a propagation time of the reception signal to generate the second chirp signal.

According to certain embodiments, the delay circuit comprises a plurality of delay cells, and wherein the circuitry is configured to control the delay circuit to pass the first chirp signal through a specified number of delay cells among the plurality of delay cells based on the propagation time.

According to certain embodiments, the circuitry is configured to control the signal generator to generate the second chirp signal based on a frequency difference between the reception signal and the first chirp signal.

According to certain embodiments, the circuitry is configured to control the signal generator to generate a digital code corresponding to the second chirp signal based on a digital code corresponding to the first chirp signal.

According to certain embodiments, the circuitry is configured to control the signal generator to generate the digital code corresponding to the second chirp signal by adding an offset obtained from the frequency of the reception signal to the first digital code corresponding to the first chirp signal.

According to certain embodiments, the first antenna and the second antenna are disposed external to the chipset.

According to certain embodiments, an electronic device (e.g., the electronic device 1200 or 1300 of FIG. 12 or 13) may include a plurality of antennas (e.g., the plurality of antennas 1239 or 1339 of FIG. 12 or FIG. 13), a radio frequency front end (RFFE) (e.g., the RFEE 1230 or 1330 of FIG. 12 or 13) connected to a plurality of antennas, the RFFE configured to process a transmitted RF signal or a received RF signal, there RFFE including a first signal generator (e.g., the first signal generator 1221 or 1321 of FIG. 12 or 13) configured to generate a first chirp signal, and a second signal generator (e.g., the delay circuit 1222 of FIG. 12 or the second signal generator 1322 of FIG. 13) configured to generate a second chirp signal, a radio frequency integrated circuit (RFIC) (e.g., the RFIC 1220 or 1320 of FIG. 12 or 13) connected to the RFFE to process a transmitted signal or a received signal, and a processor (e.g., the processor 1210 or 1310 of FIG. 12 or 13) operatively connected with the RFIC and the RFFE. The processor may be configured to transmit the first chirp signal with a first at least one of the plurality of antennas, add a specific offset to the first chirp signal, thereby resulting in the second chirp signal, synthesize the second chirp signal with a first reception signal received by a second at least one antenna, thereby resulting in a first synthesized signal, and filter the first synthesized signal.

According to certain embodiments, the processor may be configured to determine a filter value for a filter, causing the filter to allow a second synthesized signal obtained by synthesizing the second chirp signal with a second reception signal received through the second at least one antenna and remove the first synthesized signal.

According to certain embodiments, the second signal generator may include a delay circuit, and the processor may be configured to time-delay the first chirp signal with the delay circuit, thereby generating the second chirp signal.

According to certain embodiments, the processor may be configured to calculate a time delay according to a propagation time of the first reception signal calculated and based on a frequency of the first reception signal.

According to certain embodiments, the delay circuit may include a plurality of delay cells, and the processor may be configured to control the delay circuit to output the second chirp signal by causing the first chirp signal to pass through a specified number of delay cells among the plurality of delay cells, based on dividing the propagation time with a delay time of each of the plurality of delay cells.

According to certain embodiments, the processor may be configured to adjust a delay amount of the delay circuit or an integer multiple of the delay amount to match a period of a signal input to the delay circuit by using an initial fixed frequency signal before the first signal generator outputs the first chirp signal.

According to certain embodiments, the processor may be configured to control the second signal generator to generate the second chirp signal, based on a frequency of the first reception signal.

According to certain embodiments, the processor may be configured to generate a second digital code corresponding to the second chirp signal, based on a first digital code corresponding to the first chirp signal.

According to certain embodiments, the processor may be configured to generate the second digital code by adding an offset obtained from the frequency of the first reception signal to the first digital code corresponding to the first chirp signal.

According to certain embodiments, the processor may be configured to transmit the first chirp signal through the first signal generator in a time interval when the RFIC does not perform a communication operation, so as to measure a frequency of the first reception signal received through the second at least one antenna, and calculate the specific offset, based on the measured frequency of the first reception signal, and control the first signal generator to generate a local oscillator (LO) signal for frequency conversion of a transmission or reception signal in a time interval when the RFIC performs the communication operation.

Figure 14:
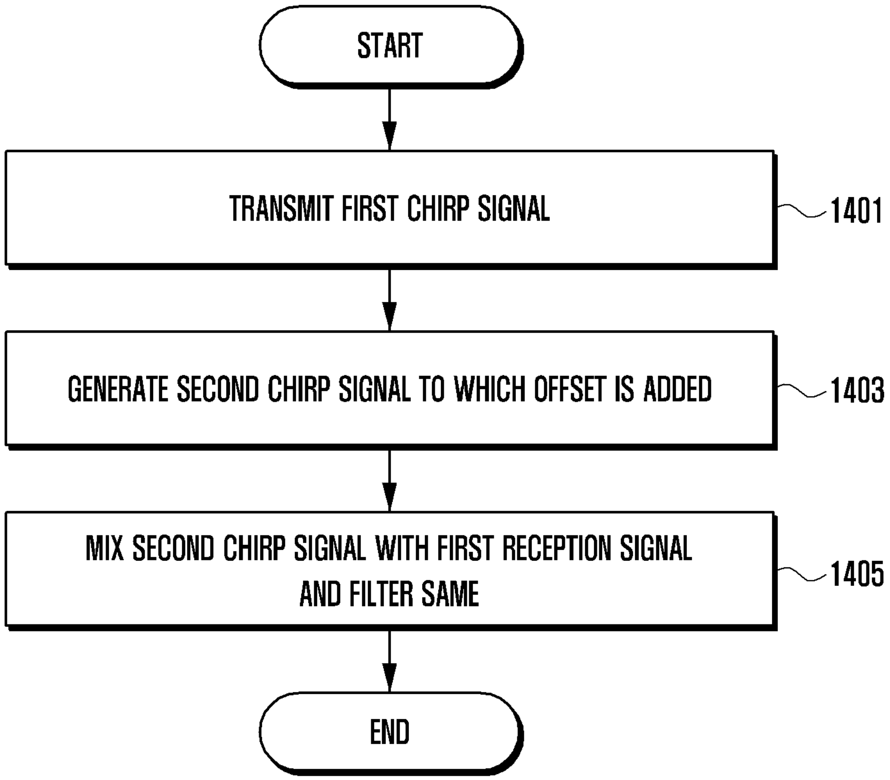
FIG. 14 is a flowchart illustrating an operation of an electronic device according to an embodiment.

FIG. 14 is a flowchart illustrating an operation of an electronic device according to an embodiment.

An electronic device (e.g., the electronic device 300, 400, 600, 1000, 1200, or 1300 of FIG. 3, 4, 6, 10, 12, or 13) according to certain embodiments may perform a control operation by being operatively connected with a communication circuit (e.g., the communication circuit 320, 420, 1220, or 1320 of FIG. 3, 4, 12, or 13) and an antenna module (e.g., the antenna module 330, 430, 630, 1030, 1230, or 1330 of FIG. 3, 4, 6, 10, 12, or 13) under the control of a processor (e.g., the processor 310, 1210, or 1310 of FIG. 3, 12, or 13).

According to certain embodiments, in operation 1401, the processor may control the communication circuit (e.g., the first signal generator 321, 621, or 1021 of FIG. 3, 6, or 10) to generate a first chirp signal, and transmit the first chirp signal through the antenna module (e.g., the first antenna 331, 631, or 1031 of FIG. 3, 6, or 10). For example, a chirp signal may be a modulation signal, the frequency of which is linearly changed according to time.

According to certain embodiments, in operation 1403, the processor may generate a second chirp signal obtained by adding an offset to the first chirp signal. The offset added to the first chirp signal may be, for example, a signal obtained by adding an offset according to a specified time delay to the first chirp signal. For example, the second chirp signal may be a signal obtained by adding an offset according to a specified frequency difference to the first chirp signal.

According to certain embodiments, the offset added to the first chirp signal may correspond to a value for correcting a coupling signal (near-end coupling signal) component coupled to a second antenna (e.g., the second antenna 332, 432, 632, or 1032 of FIG. 3, 4, 6, or 10) and received by the communication circuit as the first chirp signal is transmitted from the communication circuit through a first antenna (e.g., the first antenna 331, 431, 631, or 1031 of FIG. 3, 4, 6, or 10).

According to certain embodiments, the offset may be an offset (e.g., a delay time) calculated by measuring a frequency of the coupling signal component coupled to the second antenna and received by the communication circuit as the first chirp signal is transmitted from the communication circuit through the first antenna, and comparing the measured frequency with the first chirp signal.

According to certain embodiments, an operation of transmitting a first chirp signal and measuring a frequency of a coupling signal component of a reception signal to calculate an offset may be performed in an environment where no object exists around the electronic device (e.g., inside a chamber without an object causing reflection).

According to certain embodiments, an offset value may be calculated and then stored. The stored offset value may then be used to generate a second chirp signal and mix the second chirp signal with a reception signal, so as to remove a coupling signal component by filtering.

According to certain embodiments, a delay time may correspond to a propagation time of the coupling signal component calculated using, for example, equation 2 described above, based on the frequency of the coupling signal component.

According to certain embodiments, when the offset added to the first chirp signal is the delay time, the communication circuit may generate and output a second chirp signal by delaying the first chirp signal by the offset through a delay circuit (e.g., the delay circuit 830 of FIG. 8).

According to certain embodiments, by dividing the propagation time of the coupling signal by a delay time of one delay cell included in the delay circuit, an N value which is the number (delay CNT) of delay cells to be operated among delay cells included in the delay circuit may be calculated. According to certain embodiments, the N value which is the number of delay cells may be stored to generate the second chirp signal.

According to certain embodiments, the offset may be an offset (e.g., a frequency difference) calculated by measuring a frequency of the coupling signal component coupled to the second antenna and received by the communication circuit as the first chirp signal is transmitted from the communication circuit through the first antenna, and comparing the measured frequency with the first chirp signal.

According to certain embodiments, the communication circuit may generate the second chirp signal, based on a stored offset code.

According to certain embodiments, the offset code may correspond to a value obtained by adding an offset corresponding to the frequency difference to a signal code for generating the first chirp signal.

According to certain embodiments, in operation 1405, the processor may mix the generated second chirp signal with a reception signal received through the second antenna of the antenna module, and filter the mixed signal. The frequency of the mixed signal obtained by mixing the second chirp signal with the reception signal may be lowered by correcting the coupling signal component, and thus the coupling signal component can be easily removed by filtering through, for example, a filter (e.g., a high pass filter).

Figure 15:
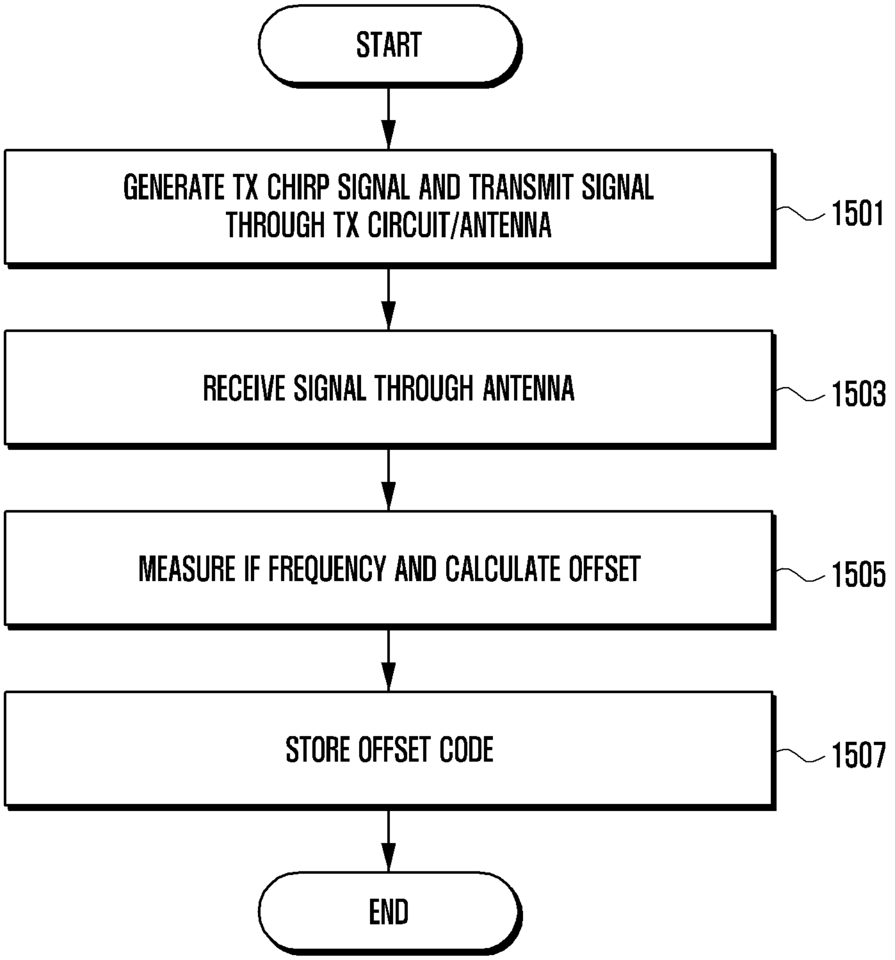
FIG. 15 is a flowchart illustrating an operation of an electronic device according to an embodiment.

FIG. 15 is a flowchart illustrating an operation of an electronic device according to an embodiment.

An electronic device (e.g., the electronic device 300, 400, 600, 1000, 1200, or 1300 of FIG. 3, 4, 6, 10, 12, or 13) according to certain embodiments may perform a control operation by being operatively connected with a communication circuit (e.g., the communication circuit 320, 420, 1220, or 1320 of FIG. 3, 4, 12, or 13) and an antenna module (e.g., the antenna module 330, 430, 630, 1030, 1230, or 1330 of FIG. 3, 4, 6, 10, 12, or 13) under the control of a processor (e.g., the processor 310, 1210, or 1310 of FIG. 3, 12, or 13).

Operations of the electronic device described with reference to FIG. 15 may be performed in an environment where no object exists around the electronic device (e.g., inside a chamber without an object causing reflection).

In operation 1501, the processor may control the communication circuit (e.g., the first signal generator 321, 621, or 1021 of FIG. 3, 6, or 10) to generate a first chirp signal, and transmit the first chirp signal through a transmission circuit and the antenna module (e.g., the first antenna 331, 631, or 1031 of FIG. 3, 6, or 10). For example, a chirp signal may be a modulation signal, the frequency of which is linearly changed according to time.

In operation 1503, the processor may receive a reception signal received through an antenna after the first chirp signal is transmitted. For example, the processor may open a reception antenna path simultaneously with transmitting the first chirp signal, and receive an input of a signal received through a second antenna (e.g., the second antenna 332, 632, or 1032 of FIG. 3, 6, or 10).

The reception signal may include a coupling signal (near-end coupling signal) component coupled to the second antenna and received by the communication circuit as the first chirp signal is transmitted from the communication circuit through a first antenna.

In operation 1505, the processor may measure an IF frequency of the reception signal and calculate an offset for the first chirp signal. For example, the offset may be calculated based on a time delay caused by a time delay with respect to the first chirp signal according to a propagation time of the reception signal. For example, the offset may be calculated based on a difference between a frequency of the reception signal and a frequency of the first chirp signal.

The offset added to the first chirp signal may correspond to a value for correcting a coupling signal (near-end coupling signal) component coupled to the second antenna and received by the communication circuit as the first chirp signal is transmitted from the communication circuit through the first antenna.

The offset may be calculated by measuring a frequency of the coupling signal component coupled to the second antenna and received by the communication circuit as the first chirp signal is transmitted from the communication circuit through the first antenna, and comparing the measured frequency with the first chirp signal.

A delay time as the offset added to the first chirp signal may be calculated based on the measured frequency of the coupling signal component, for example, based on a propagation time of the coupling signal component calculated using equation 2 described above.

The calculated offset (e.g., a delay time) may be used to output the first chirp signal after the communication circuit delays the first chirp signal through a delay circuit (e.g., the delay circuit 830 of FIG. 8).

By dividing the propagation time of the coupling signal by a delay time of one delay cell included in the delay circuit, an N value which is the number (delay CNT) of delay cells to be operated among delay cells included in the delay circuit may be calculated.

The offset may include a frequency difference calculated by comparing the frequency of the first chirp signal and the measured frequency of the coupling signal component.

The offset may include an offset code obtained by adding an offset corresponding to the frequency difference to a signal code for generating the first chirp signal.

In operation 1507, the processor may store the calculated offset. For example, a digital code corresponding to the calculated delay time may be stored as an offset. For example, an offset code corresponding to the calculated frequency difference may be stored as an offset. For example, the stored offset value may then be used to generate a second chirp signal.

As the second chirp signal generated based on the stored offset value is mixed with a reception signal, a frequency of a coupling signal component included in the reception signal is lowered and thus the coupling signal component can be easily removed by filtering.

The embodiments disclosed herein are only examples proposed in order to easily describe the technical contents and help with comprehension of the technical contents, and do not limit the scope of the technology disclosed herein. Therefore, the scope of the technology disclosed herein should be interpreted to include all changes or modified forms derived based on the technical spirit of certain embodiments disclosed herein in addition to the embodiments disclosed herein.

What is claimed is:

1. An electronic device comprising:

a first antenna;

a second antenna;

a first signal generator configured to generate a first chirp signal;

a second signal generator configured to generate a second chirp signal by adding an offset to the first chirp signal;

a high pass filter; and a processor operatively connected with the first signal generator and the second signal generator, wherein the processor is configured to:

control the first signal generator to transmit the first chirp signal through the first antenna;

control to receive a reception signal through the second antenna in association with the first chirp signal transmitted through the first antenna;

control to mix the second chirp signal with the reception signal to generate a third signal, wherein the reception signal includes a coupling signal component coupled to the second antenna on a path of the first chirp signal transmitted through the first antenna, and a frequency of the third signal is lowered based on the offset; and control to filter the third signal through the high pass filter to remove the coupling signal component from the third signal, wherein the high pass filter is a single high pass filter through which the third signal is filtered.

2. The electronic device of claim 1, wherein the processor is configured to, in generating the second chirp signal, control the second signal generator to add the offset to the first chirp signal for correcting, from the reception signal, the coupling signal component coupled to the second antenna on the path of the first chirp signal transmitted through the first antenna.

3. The electronic device of claim 2, wherein the processor is configured to control to mix the second chirp signal with the reception signal to lower the frequency of the third signal for the coupling signal component to be removed from the reception signal by mixing the second chirp signal with the reception signal and for passing a reflection signal component of the reception signal upon filtering of the third signal, wherein the reflection signal component represents the first chirp signal transmitted through the first antenna and reflected by an external object.

4. The electronic device of claim 2, wherein the processor is configured to control to add the offset to the first chirp signal to generate the second chirp signal based on a time delay or a frequency difference to the first chirp signal.

5. The electronic device of claim 4, wherein the second signal generator comprises a delay circuit configured to delay the first chirp signal based on a propagation time of the reception signal to generate the second chirp signal.

6. The electronic device of claim 5, wherein the delay circuit comprises a plurality of delay cells, and wherein the processor is configured to control the delay circuit to pass the first chirp signal through a specified number of delay cells among the plurality of delay cells based on the propagation time.

7. The electronic device of claim 4, wherein the processor is configured to control the second signal generator to generate the second chirp signal based on a frequency difference between the reception signal and the first chirp signal.

8. The electronic device of claim 7, wherein the processor is configured to generate a digital code corresponding to the second chirp signal based on a digital code corresponding to the first chirp signal.

9. The electronic device of claim 8, wherein the processor is configured to generate the digital code corresponding to the second chirp signal by adding an offset obtained from the frequency of the reception signal to a first digital code corresponding to the first chirp signal.

10. The electronic device of claim 1, wherein the processor is configured to transmit the first chirp signal while the electronic device is located in a specified environment, measure a frequency of the reception signal received through the second antenna, calculate the offset based on the measured frequency of the reception signal and store the calculated offset for generating the second chirp signal.

11. A chipset comprising:

a signal generator;

a high pass filter; and circuitry configured to:

control the signal generator to transmit a first chirp signal through a first antenna and to generate a second chirp signal by applying an offset to the first chirp signal, receive a reception signal through a second antenna in association with the first chirp signal transmitted through the first antenna, mix the second chirp signal with the reception signal to generate a third signal, wherein the reception signal includes a coupling signal component coupled to the second antenna on a path of the first chirp signal transmitted through the first antenna, and wherein a frequency of the third signal is lowered based on the offset, and filter the third signal through the high pass filter to remove the coupling signal component from the third signal, wherein the high pass filter is a single high pass filter through which the third signal is filtered.

12. The chipset of claim 11, wherein the circuitry is configured to, in generating the second chirp signal, control the signal generator to add the offset to the first chirp signal for correcting, from the reception signal, the coupling signal component coupled to the second antenna on the path of the first chirp signal transmitted through the first antenna.

13. The chipset of claim 12, wherein the circuitry is configured to control to mix the second chirp signal with the reception signal to lower the frequency of the third signal for the coupling signal component to be removed from the reception signal by mixing the second chirp signal with the reception signal and for passing a reflection signal component of the reception signal upon filtering of the third signal, wherein the reflection signal component represents the first chirp signal transmitted through the first antenna and reflected by an external object.

14. The chipset of claim 12, wherein the circuitry is configured to control the signal generator to add the offset to the first chirp signal to generate the second chirp signal based on a time delay or a frequency difference to the first chirp signal.

15. The chipset of claim 14, wherein the signal generator comprises a delay circuit configured to delay the first chirp signal based on a propagation time of the reception signal to generate the second chirp signal.

16. The chipset of claim 15, wherein the delay circuit comprises a plurality of delay cells, and wherein the circuitry is configured to control the delay circuit to pass the first chirp signal through a specified number of delay cells among the plurality of delay cells based on the propagation time.

17. The chipset of claim 14, wherein the circuitry is configured to control the signal generator to generate the second chirp signal based on a frequency difference between the reception signal and the first chirp signal.

18. The chipset of claim 17, wherein the circuitry is configured to control the signal generator to generate a digital code corresponding to the second chirp signal based on a digital code corresponding to the first chirp signal.

19. The chipset of claim 18, wherein the circuitry is configured to control the signal generator to generate the digital code corresponding to the second chirp signal by adding an offset obtained from the frequency of the reception signal to a first digital code corresponding to the first chirp signal.

20. The chipset of claim 11, wherein the first antenna and the second antenna are disposed external to the chipset.

* * * * *